(12) United States Patent
Yamana et al.

(10) Patent No.: US 6,849,145 B2
(45) Date of Patent: Feb. 1, 2005

(54) METHOD OF PRODUCING CERAMIC GREEN SHEET AND METHOD OF MANUFACTURING MULTILAYER CERAMIC ELECTRONIC PART

(75) Inventors: Tsuyoshi Yamana, Kyoto (JP); Takaharu Miyazaki, Shiga-ken (JP)

(73) Assignee: Murata Manufacturing Co. Ltd (JP)

( * ) Notice: Subject to any disclaimer, the term of this patent is extended or adjusted under 35 U.S.C. 154(b) by 30 days.

(21) Appl. No.: 10/448,118

(22) Filed: May 30, 2003

(65) Prior Publication Data

US 2003/0230374 A1 Dec. 18, 2003

Related U.S. Application Data

(62) Division of application No. 09/690,788, filed on Oct. 17, 2000, now Pat. No. 6,692,598.

(30) Foreign Application Priority Data

Oct. 18, 1999 (JP) .............................. 11-295324
Oct. 18, 1999 (JP) .............................. 11-295326

(51) Int. Cl.[7] ........................... B32B 31/26; H01G 4/12; B28B 11/08
(52) U.S. Cl. ................ 156/89.12; 156/89.16; 156/246; 427/96; 427/126.2
(58) Field of Search ........................... 156/89.12, 89.16, 156/246, 249; 264/614, 615, 618, 619, 620, 650; 427/96, 126.2

(56) References Cited

U.S. PATENT DOCUMENTS 4,009,238 A * 2/1977 Niedermeier et al. ........ 264/614
6,320,738 B1 * 11/2001 Yamana et al. ........ 361/321.12
6,692,598 B1 * 2/2004 Yamana et al. .......... 156/89.12

FOREIGN PATENT DOCUMENTS

| JP | 63-244789 | * | 10/1988 |
| JP | 7-14745 | * | 1/1995 |
| JP | 11-97285 | * | 4/1999 |

* cited by examiner

Primary Examiner—Melvin C. Mayes
(74) Attorney, Agent, or Firm—Dickstein, Shapiro, Morin & Oshinsky, LLP.

(57) ABSTRACT

A ceramic green sheet having good surface roughness and few pinhole defects even when producing a thin ceramic green sheet is stably produced, to permit efficiently and securely manufacturing a multilayer ceramic electronic part in which deterioration of its life due to unevenness of interfaces between internal electrodes and ceramic layers and the occurrence of structural defects, such as delamination, bending of an electrode portion, etc, in a multilayer thin film to be suppressed. A dry sheet obtained by forming ceramic slurry to a sheet on a carrier film is smoothed by pressing using a plate press, a hydrostatic press or a calender roll under predetermined temperature and pressure conditions to improve the surface smoothness of the ceramic green sheet independently of the particle diameter of the ceramic and its dispersibility. An electrode paste is coated in a predetermine pattern on the thus-produced ceramic green sheet to form a sheet provided with an electrode. A plurality of the sheets provided with electrodes are laminated, and the burned to produce a multilayer ceramic electronic part.

11 Claims, 4 Drawing Sheets

METHOD OF PRODUCING CERAMIC GREEN SHEET AND METHOD OF MANUFACTURING MULTILAYER CERAMIC ELECTRONIC PART

This is a division of application Ser. No. 09/690,788, filed Oct. 17, 2000, now U.S. Pat. No. 6,692,598.

BACKGROUND OF THE INVENTION

1. Field of the Invention

The present invention relates to method of producing a ceramic green sheet used for manufacturing a multilayer ceramic electronic part such as a monolithic ceramic capacitor, a multilayer varistor, or the like. The present invention also relates to a multilayer ceramic electronic part, particularly to a method of manufacturing a multilayer ceramic electronic part having a structure in which a plurality of internal electrodes are disposed with ceramic layers provided therebetween.

2. Description of the Related Art

Although a monolithic ceramic capacitor which is a typical example of multilayer ceramic electronic parts is widely used for various applications, the monolithic ceramic capacitors have, with progress of miniaturization of electronic parts, recently increasingly been required to have a small size and large capacity.

The monolithic ceramic capacitor has a structure, for example, shown in FIG. 1, in which a ceramic element 3 comprises a plurality of internal electrodes 2a and 2b opposed to each other with ceramic layers serving as dielectric layers provided therebetween, ends of the internal electrodes 2a and 2b being led to different side ends of the ceramic element 3, and a pair of external electrodes 4a and 4b are disposed at both sides of the ceramic element 3 to be connected to the internal electrodes 2a and 2b, respectively.

Ceramic green sheets used for manufacturing the monolithic ceramic capacitor are used for forming the above-described ceramic layers serving as the dielectric layers, and the ceramic green sheets have recently increasingly been thinned in order to increase the acquirable capacitance and decrease the product size.

Each of the green sheets is generally produced by forming ceramic slurry in a sheet shape and then drying. As the method of forming ceramic slurry in a sheet, various methods such as a doctor blade method, a reverse roll coater method and the like, are used.

For example, FIG. 2 shows an example of conventional methods of producing ceramic green sheets, in which a carrier film 52 is supplied from a carrier film supply unit (carrier film supply roller) 51, and a ceramic slurry 54 is coated on the carrier film 52 by a ceramic slurry coater (sheet former) (in this example, using the doctor blade method) 53 at a predetermined position, and conveyed together with the carrier film 52 to a drier 55 for drying the ceramic slurry 54 to form a ceramic green sheet 56. Then, the carrier film 52 holding the ceramic green sheet 56 formed on the surface thereof is wound by a sheet recovery roller 57 so that the formed ceramic green sheet 56 held by the carrier film 52 is recovered.

In the monolithic ceramic capacitor shown in FIG. 1, when the ceramic layers 2 interposed between the internal electrodes 2a and 2b have a thickness (element thickness) of 3 μm or less, thin ceramic green sheets must be produced as ceramic green sheets used for the ceramic layers. However, in producing thin ceramic green sheets by the above-described conventional method, there are the problems of roughening the surfaces of the ceramic green sheets and producing pinhole defects (pores) in the ceramic green sheets.

Furthermore, ceramic dielectric materials such as barium titanate, strontium titanate, calcium titanate and the like, which have a perovskite structure, are conventionally widely used as capacitor materials to utilize their high relative dielectric constants. Also, as a capacitor which is a passive part, a small capacitor which can obtain high capacitance has recently been demanded with miniaturization of electronic parts.

A conventional monolithic ceramic capacitor using a ceramic dielectric material for a dielectric layer must be burned at a high temperature of about 1300° C. in air, and thus a noble metal such as palladium must be used as an internal electrode material. However, such a noble metal material is very expensive and increases the cost ratio of the electrode material in a product. This is a main factor which hinders a decrease in cost.

Therefore, in order to solve the problem, the internal electrodes of the monolithic ceramic capacitor are increasingly made of a base metal material, and various dielectric materials which can be burned in a neutral or reducing atmosphere and which have reduction resistance are developed for preventing oxidation of electrodes during burning.

Under these conditions, the monolithic ceramic capacitor is required to have a smaller size and larger capacity, leading to the progress of development in techniques for increasing the dielectric constant of a ceramic dielectric material and thinning ceramic dielectric layers and internal electrode layers.

However, when each of the ceramic layers (the ceramic layers interposed between the internal electrodes) has a thickness (element thickness) of 3 μm or less, unevenness in the interfaces between the ceramic dielectric layers and the internal electrode layers is increased, or defects (pores) in the ceramic dielectric layers are increased, thereby causing the problem of decreasing the lifetime.

In order to improve the smoothness of a ceramic green sheet used for forming the ceramic layer, and increase the density of the ceramic green sheet, a method has been disclosed in which the particle diameter of a ceramic powder material is decreased (Japanese Unexamined Patent Publication No. 10-223469).

However, as the particle diameter decreases, generally, the ceramic powder itself readily agglomerates to decrease dispersibility. Therefore, the method of decreasing the particle diameter has limits of improvement in the surface smoothness of the ceramic green sheet and increase in the density thereof. For a ceramic dielectric powder having the same composition, the dielectric constant decreases as the particle diameter decreases, thereby causing the problem of making it impossible to comply with a large-capacity monolithic ceramic capacitor.

One method of dispersing ceramic slurry comprises rotating the ceramic slurry at a high speed by a sand mill or visco mill to supply great shear force to the ceramic slurry. However, although dispersion proceeds by applying the shear force to the ceramic powder, this method has the problem of partially grinding the ceramic powder. Grinding the ceramic powder improves the surface smoothness of a sheet due to an increase in dispersibility, but characteristics are changed by grinding the ceramic powder to cause the problem of deviating the temperature characteristics of the resultant monolithic ceramic capacitor from the desired range of design, and decreasing the dielectric constant of the ceramic dielectric.

Furthermore, the number of the layers laminated must be increased while decreasing the size of the monolithic ceramic capacitor and increasing the capacity thereof, and thus a monolithic ceramic capacitor is developed in which about 300 thin ceramic green sheets having an element thickness of 3 μm or less are laminated.

However, with not less than 300 layers laminated, the step formed by the thickness of an internal electrode is increased to cause the problem of producing delamination due to the step of the electrode, and the problem of bending electrode portions being extended for connecting the internal electrodes to external electrodes and producing a short-circuit defect.

These problems apply to not only the monolithic ceramic capacitor but also other multilayer ceramic electronic parts.

SUMMARY OF THE INVENTION

The present invention has been achieved for solving the above problems, and an object of the present invention is to provide a method of producing a ceramic green sheet capable of stably producing a ceramic green sheet having good surface smoothness and few pinhole defects even when producing a thin ceramic green sheet. Another object of the present invention is to provide a method of manufacturing a multilayer ceramic electronic part which is capable of securely and efficiently manufacturing a multilayer ceramic electronic part and preventing deterioration in its life due to unevenness in the interfaces between internal electrodes and ceramic layers, and the occurrence of a structural defect (delamination, bending of an electrode portion, or the like) in a multilayer thin film.

In order to achieve the objects of the present invention, a method of producing a ceramic green sheet comprises the forming step of coating ceramic slurry containing a ceramic powder dispersed in a dispersion medium on a carrier film to form a sheet, the drying step of drying the sheet-formed ceramic slurry on the carrier film, and the smoothing step of pressing the dry sheet obtained by drying the ceramic slurry on the carrier film by using a plate press comprising at least a pair of pressing plates under conditions of a pressing plate surface temperature of about 0 to 150° C. and a pressing pressure of about 500 to 10,000 kgf/cm² to smooth the surface of the sheet.

The dry sheet (a ceramic green sheet not subjected to smoothing process) obtained by forming the ceramic slurry in a sheet on the carrier film and then drying is pressed with the plates for each carrier film by using the plate press under conditions of a pressing plate surface temperature of about 0 to 150° C. and a pressing pressure of about 500 to 10,000 kgf/cm², and thus the surface smoothness of the ceramic green sheet can be improved independently of the particle diameter and dispersibility of ceramic. Therefore, a ceramic green sheet suitable for use for manufacturing a monolithic ceramic capacitor can securely be produced.

The plate press comprises, for example, a pair of parallel plates (pressing plates) each comprising a mirror-polished hard chromium plated layer provided on the surface thereof, a pressure control for controlling the pressing pressure of the pressing plates, and a heater for heating the pressing plates to a predetermined temperature so that the ceramic green sheet can be held between the pair of pressing plates, and pressurized from both sides under heating to the predetermined temperature to smooth the surface of the ceramic green sheet. The construction of the plate press is not limited.

In smoothing by the plate pressing method, ceramic green sheets may be pressed one by one, or a plurality of sheets may be stacked and pressed. However, in order to prevent the ceramic green sheet from adhering to the pressing plates, the processed surface of a film subjected to separating process is preferably attached to the surface of the ceramic green sheet, followed by pressing. In pressing a plurality of ceramic green sheets, in order to prevent each ceramic green sheet from adhering to the carrier film superposed thereon, the processed surface of a film subjected to separating process is preferably attached to the surface of each ceramic green sheet, or a carrier film on the back of which is subjected to separating process is preferably used.

In the present invention, the pressing plate surface temperature is in the range of about 0 to 150° C. because with a temperature of less than about 0° C., the sheet surface is hardened to deteriorate the effect of decreasing the surface roughness (Ra), while with a temperature of over about 150° C., the sheet is softened due to thermoplasticity to transfer the sheet from the carrier film to the pressing plate side.

In addition, the pressing pressure is in the range of about 500 to 10,000 kgf/cm² because with a pressing pressure of less than about 500 kgf/cm², the sufficient surface smoothing effect cannot be obtained, while with a pressing pressure of over about 10,000 kgf/cm², the ceramic green sheet is separated from the carrier film or broken, thereby making processing impossible.

The method of producing a ceramic green sheet of the present invention is preferably characterized by plate pressing under conditions of a pressing plate surface temperature of about 20 to 100° C. and a pressing pressure of about 1,000 to 6,000 kgf/cm². Plate pressing under conditions of a pressing plate surface temperature of about 20 to 100° C. and a pressing pressure of about 1,000 to 6,000 kgf/cm² can more securely improve the surface smoothness of the ceramic green sheet.

The reason for limiting the pressing plate surface temperature to about 100° C. or less is that heating the ceramic green sheet at about 100 to 150° C. causes transfer of the ceramic green sheet to the pressing plate side due to thermoplasticity in some cases, thereby wrinkling the surface and deteriorating the effect of decreasing surface roughness.

The reason for limiting the pressing pressure between the pressing plates to about 6,000 kgf/cm² or less is that with a pressing pressure of about 6,000 to 10,000 kgf/cm², wrinkles can occur on the surface of the ceramic green sheet, thereby deteriorating the effect of decreasing surface roughness.

In plate-pressing under the temperature condition and pressure condition in the ranges suitable for the ceramic green sheet, the effect of smoothing the surface of the ceramic green sheet can securely be obtained without separating the ceramic green sheet from the carrier film or breaking the ceramic green sheet.

In another aspect of the present invention, a method of producing a ceramic green sheet comprises the forming step of coating a ceramic slurry containing a ceramic powder dispersed in a dispersion medium on a carrier film to form a sheet, the drying step of drying the sheet-formed ceramic slurry on the carrier film, and a smoothing step of hydrostatically pressing the dry sheet obtained by drying the ceramic slurry on the carrier film using a hydrostatic press under conditions of a pressing temperature of about 0 to 150° C. and a pressing pressure of about 500 to 10,000 kgf/cm² to smooth the surface of the sheet.

A dry sheet (a ceramic green sheet not subjected to smoothing process) obtained by forming the ceramic slurry in a sheet on the carrier film and then drying is hydrostatically pressed for each carrier film by using the hydrostatic press under conditions of a pressing temperature of about 0 to 150° C. and a pressing pressure of about 500 to 10,000 kgf/cm$^2$, and thus the surface smoothness of the ceramic green sheet can be improved independently of the particle diameter and dispersibility of ceramic. Therefore, the ceramic green sheet suitable for use for manufacturing a monolithic ceramic capacitor can securely be produced.

The hydrostatic press comprises, for example, a pressure container filled with a liquid such as oil or water, a pressure cylinder for pressurizing the liquid, a control for controlling the pressure applied to the liquid, and a heat exchanger for heating the liquid to a predetermined temperature. For example, the ceramic green sheet is wound on the mirror-polished surface of a metal roll, packed with a flexible sheet under vacuum, and then immersed in the liquid of the hydrostatic press, such as oil or water, followed by hydrostatic pressing. As a result, the ceramic green sheet is pressed on the surface of the metal roll and the film on the back of the ceramic green sheet under uniform pressure to smooth the surface of the ceramic green sheet. The construction of the hydrostatic press is not limited, and a roll comprising a material other than a metal may be used in place of the metal roll.

In pressing a ceramic green sheet which is wound on the metal roll over and over by the hydrostatic pressing method, a carrier film having its back subjected to separating process is preferably used.

For the ceramic green sheet wound on the metal roll over and over, the thickness of the whole ceramic green sheet is increased, and thus the pressure applied to both ends of the wound ceramic green sheet cannot be neglected, thereby causing deformation in some cases. In this case, flanges are provided at both ends of the metal roll, and the ceramic green sheet is wound on the metal roll so that both ends of the ceramic green sheet closely contact the flanges to prevent an adverse effect on both ends of the ceramic green sheet.

The hydrostatic pressing may be performed by using a flat plate in place of the metal roll. In hydrostatically pressing a plurality of ceramic green sheets stacked, a carrier film having its back subjected to separating process is preferably used.

In the present invention, the pressing temperature is in the range of about 0 to 150° C., and the pressing pressure is in the range of about 500 to 10,000 kgf/cm$^2$ for the same reasons for the limits as the plate pressing method for smoothing.

In the method of producing a ceramic green sheet of the present invention, hydrostatic pressing is preferably performed under conditions of a pressing temperature of about 20 to 100° C. and a pressing pressure of about 1,000 to 6,000 kgf/cm$^2$. The hydrostatic pressing under the conditions of a pressing temperature of about 20 to 100° C. and a pressing pressure of about 1,000 to 6,000 kgf/cm$^2$ can more securely improve smoothness of the surface of the ceramic green sheet.

The reasons for limiting the pressing temperature to about 20 to 100° C. and the pressing pressure to about 1,000 to 6,000 kgf/cm$^2$ are the same as the pressing plate surface temperature in the range of about 0 to 100° C. and the pressing pressure in the range of about 1,000 to 6,000 kgf/cm$^2$.

As described above, hydrostatic pressing under temperature and pressure conditions in the ranges suitable for the ceramic green sheet can securely achieve the effect of smoothing the surface of the ceramic green sheet without causing separation of the ceramic green sheet from the carrier film or breakage of the ceramic green sheet.

In a further aspect of the present invention, a method of producing a ceramic green sheet comprises the forming step of coating ceramic slurry containing a ceramic powder dispersed in a dispersion medium on a carrier film to form a sheet, the drying step of drying the sheet-formed ceramic slurry on the carrier film, and the smoothing step of calendering a dry sheet obtained by drying the ceramic slurry on the carrier film using a calender roll comprising at least a pair of nip rolls under conditions of a nip roll surface temperature of about 0 to 150° C. and a pressing pressure (linear pressure) of about 50 to 1,000 kgf/cm to smooth the surface of the sheet.

The dry sheet (a ceramic green sheet not subjected to smoothing process) obtained by forming the ceramic slurry in a sheet on the carrier film and then drying is calendered for each carrier film by using the calender roll under conditions of a nip roll surface temperature of about 0 to 150° C. and a pressing pressure (linear pressure) of about 50 to 1,000 kgf/cm, and thus the surface smoothness of the ceramic green sheet can be improved independently of the particle diameter and dispersibility of ceramic. Therefore the ceramic green sheet suitable for use for a monolithic ceramic capacitor can securely be produced.

The calender roll comprises, for example, a preheating roll (which may not be provided in some cases) for preheating the ceramic green sheet, at least a pair of nip rolls, and a heat exchanger for heating the nip rolls so that the ceramic green sheet is held between the pair of nip rolls and pressed from both sides to smooth the surface of the ceramic green sheet under pressure. The construction of the calender roll is not limited, and various types of calender rolls such as a single nip roll-type calender roll, a multi-stage nip roll-type calender roll comprising plural pairs of nip rolls, and the like can also be used.

In the present invention, the reason for setting the nip roll surface temperature in the range of about 0 to 150° C. is that with a temperature of about 0° C. or less, the sheet surface is hardened to deteriorate the effect of decreasing surface roughness (Ra), while with a temperature of over about 150° C., the sheet is softened by thermoplasticity to be separated from the carrier film and transferred to the pressing plate side.

The reason for setting the pressing pressure (linear pressure) in the range of about 50 to 1,000 kgf/cm is that with a linear pressure of less than about 50 kgf/cm, the sufficient surface smoothing effect cannot be obtained, while with a linear pressure of over about 1,000 kgf/cm, the ceramic green sheet is separated from the carrier film or broken to make processing impossible.

In the method of producing a ceramic green sheet of the present invention, calendering is preferably performed under conditions of a nip roll surface temperature of about 20 to 100° C. and a pressing pressure (linear pressure) of about 100 to 600 kgf/cm. The calendering under the conditions of a nip roll surface temperature of about 20 to 100° C. and a pressing pressure (linear pressure) of about 100 to 600 kgf/cm can more securely improve smoothness of the surface of the ceramic green sheet.

The reason for limiting the nip roll surface temperature to about 100° C. or less is that heating the ceramic green sheet at about 100 to 150° C. causes transfer of the ceramic green sheet to the pressing plate side due to thermoplasticity in some cases, thereby wrinkling the surface, and deteriorating the effect of decreasing surface roughness.

The reason for limiting the pressing pressure (linear pressure) to about 600 kgf/cm or less is that with a pressing pressure (linear pressure) of about 600 to 1000 kgf/cm, wrinkles can occur on the surface of the ceramic green sheet in some cases, thereby deteriorating the effect of decreasing surface roughness.

As described above, calendering under temperature and pressure (linear pressure) conditions in the ranges suitable for the ceramic green sheet can securely achieve the effect of smoothing the surface of the ceramic green sheet without causing separation of the ceramic green sheet from the carrier film, and breakage of the ceramic green sheet.

In the method of producing a ceramic green sheet, the smoothing is performed so that the surface roughness (Ra value) of the ceramic green sheet is about 100 nm or less.

In a multilayer ceramic electronic part in which each of the ceramic layers interposed between internal electrodes has a thickness (element thickness) of 3 $\mu$m or less, the use of the ceramic green sheet having surface roughness (Ra value) of over about 100 nm for manufacturing the part has the tendency that the lifetime abruptly decreases. By applying the present invention, the surface (Ra value) roughness of a thin ceramic green sheet can be decreased to about 100 nm or less, and the durability of the multilayer ceramic electronic part manufactured by using the ceramic green sheet can be improved.

In the present invention, the surface roughness (Ra value) is determined based on measurements (nm) of a region of 5 $\mu$m square obtained by using an atomic force microscope.

In the method of producing a ceramic green sheet of the present invention, the ceramic green sheet is separably held by a carrier film because ceramic green sheets are separated from the carrier films, and then laminated in use for manufacturing a multilayer ceramic electronic part.

The present invention is particularly useful for producing a thin ceramic green sheet for a multilayer ceramic electronic part required to have excellent surface smoothness. In the forming step of forming ceramic slurry in a sheet, and in the smoothing step of smoothing the surface, the ceramic green sheet is held by the carrier film, while in the lamination step, the ceramic green sheet can be separated from the carrier film. For example, a multilayer ceramic electronic part such as a thin layer multilayer-type monolithic ceramic capacitor or the like can be efficiently manufactured, in which thin ceramic layers are interposed between internal electrodes.

In manufacturing a multilayer ceramic electronic part by using ceramic green sheets produced by the method of producing a ceramic green sheet of the present invention, the surface roughness (Ra) of the interfaces between ceramic layers and internal electrodes can be decreased.

Smoothing the ceramic green sheet can increase the density of the ceramic green sheet, thereby decreasing the rate of occurrence of pores in a dielectric element of a capacitor.

Furthermore, since the density of the sheet is increased to suppress a sheet attack phenomenon in which the solvent component of an electrode paste permeates into the sheet to dissolve the sheet binder.

As a result, by using the ceramic green sheet produced by the producing method of the present invention, a multilayer ceramic electronic part having long life and excellent reliability can be manufactured.

The present invention is useful for producing ceramic green sheets for a multilayer ceramic electronic part in which the thickness (element thickness) of each of the ceramic layers is 3 $\mu$m or less. By using ceramic green sheets produced by the producing method of the present invention for manufacturing a monolithic ceramic capacitor, for example, a large-capacity small monolithic ceramic capacitor having excellent electric properties and comprising a multilayer thin film can be efficiently manufactured.

In a still further aspect of the present invention, a method of manufacturing a multilayer ceramic electronic part comprises the forming step of forming ceramic slurry in a sheet, the smoothing step of pressing the formed ceramic green sheet to smooth the surface thereof, the sheet forming step of coating electrode paste for forming an internal electrode on the smoothed ceramic green sheet in a predetermined pattern to form a sheet provided with an electrode, and the lamination step of laminating the sheets provided with electrodes to form a lamination, and the burning step of burning the lamination.

The ceramic green sheet obtained by forming the ceramic slurry in a sheet is smoothed, and then the electrode paste for forming an internal electrode is coated in the predetermined pattern to form the sheet provided with an electrode. A plurality of the sheets provided with electrodes are laminated to form the lamination, followed by burning under predetermined conditions so that the multilayer ceramic electronic part can be efficiently manufactured while preventing deterioration in its life due to unevenness in the interfaces between internal electrodes and ceramic layers, and the occurrence of a structural defect (delamination, bending of an electrode portion or the like) in a multilayer thin film.

The process for smoothing the ceramic green sheet can improve the surface smoothness of the ceramic green sheet independently of the particle diameter and dispersibility of ceramic particles, thereby decreasing the surface roughness (Ra) in the interfaces between the ceramic layers and the internal electrodes of the manufactured multilayer ceramic electronic part.

Furthermore, since the density of the sheet is increased by smoothing, it is possible to prevent the sheet attack phenomenon in which the solvent component of the electrode paste permeates into the sheet to dissolve the sheet binder.

In the present invention, the ceramic green sheet is subjected to the smoothing process, and thus unlike a method for realizing the surface smoothness of the ceramic green sheet by using the high degree of dispersibility of ceramic particles, excessive shear force need not be applied to the ceramic particles during dispersion of ceramic slurry, thereby suppressing and preventing grinding of the ceramic particles. Therefore, it is possible to efficiently prevent the characteristics of the multilayer ceramic electronic part from deviating from the target ranges, or the characteristic values from becoming lower than the target characteristic values due to variations in agglomeration with ceramic particle lots. Specifically, for example, in a monolithic ceramic capacitor, it is possible to efficiently prevent the occurrence of a problem in which the design temperature characteristics are deviated from the target characteristics or only a capacity value lower than the design capacity can be obtained.

In the present invention, "the step of laminating the sheets provided with electrodes to form the lamination" is a wide concept including not only a case in which only sheets provided with electrodes are laminated, but also a case in which sheets provided with electrodes are laminated and ceramic green sheets (outer layer sheets) provided with no electrode are laminated on upper and lower sides of the lamination of the sheets provided with electrodes to form a lamination.

In the present invention, "the ceramic slurry" is a wide concept including not only slurry containing ceramic powder dispersed in a dispersion medium, but also slurry further containing additives such as a binder, a plasticizer, etc.

In the present invention, the ceramic green sheet is preferably obtained by forming the ceramic slurry in a sheet on a carrier film so that the ceramic green sheet held by the film is conveyed and subjected to the smoothing process. By smoothing the ceramic green sheet held by the carrier film, breakage of the ceramic green sheet in the smoothing process can be prevented even in the case of a thin ceramic green sheet, thereby efficiently producing a thin ceramic green sheet having excellent surface smoothness, a high density and high reliability.

In the method of manufacturing a multilayer electronic part of the present invention, the electrode paste for forming an internal electrode contains a base metal powder as a conductive component so that the internal electrode formed after burning the lamination comprises a base metal.

By using the ceramic green sheet subjected to the smoothing process, as described, even in forming internal electrodes (base metal internal electrodes) by using the electrode paste containing the base metal powder as the conductive component, it is possible to manufacture a multilayer electronic part which produces less deterioration of its life due to unevenness in the interfaces between the internal electrodes and the ceramic layers, and less structural defect (delamination, bending of an electrode portion or the like) in a multilayer thin film, thereby decreasing the electrode material cost without deteriorating reliability.

The present invention can be applied not only to a case in which the constituent material of the internal electrodes is a base metal, but also to a case in which a multilayer ceramic electronic part comprising internal electrodes made of a base metal is manufactured.

In the method of manufacturing a multilayer ceramic electronic part, the smoothing process is performed by using any one of the calender roll method, the plate pressing method and the hydrostatic pressing method.

As the smoothing method, any one of the calender roll method, the plate pressing method and the hydrostatic pressing method is used for smoothing the surface of the ceramic green sheet by pressuring it, thereby securely smoothing the surface of the green sheet and improving the smoothness of the interfaces between internal electrodes and ceramic layers. As a result, the pressure resistance, durability (life) and reliability of properties of the multilayer ceramic electronic part can be improved. The smoothing process by the above method can increase the sheet density to improve avoidance of defects such as pores of the ceramic layers. The calender roll method, the plate pressing method or the hydrostatic method preferably uses an equipment constructed so that the ceramic green sheet can be smoothed by pressurization under heating to a predetermined temperature.

The calender roll method uses a calender roll comprising, for example, a preheating roll (which may not be provided in some cases) for preheating the ceramic green sheet, and at least a pair of nip rolls (preferably comprising heating means) so that the ceramic green sheet is held between the pair of nip rolls and pressed from both sides to smooth the surface of the ceramic green sheet under pressure. The construction of the calender roll is not limited, and various types of calender rolls such as a single nip roll-type calender roll, a multi-stage nip roll-type calender roll comprising plural pairs of nip rolls, and the like, can also be used.

As the conditions for smoothing by the calender roll method, it is important to appropriately control the surface temperature of the nip rolls for nipping the ceramic green sheet and the linear pressure of the nip rolls. The surface temperature and the linear pressure are preferably controlled to the range of about 0 to 150° C., and the range of about 50 to 1,000 kgf/cm, more preferably to the range of about 20 to 100° C., and the range of about 100 to 600 kgf/cm, respectively.

The plate pressing method uses a plate press comprising, for example, a pair of parallel plates each comprising a mirror-polished hard chromium plated layer provided on the surface thereof, and a pressure control for controlling the pressing pressure of the pressing plates so that ceramic green sheet is held between the pair of pressing plates and pressurized from both sides to smooth the surface of the ceramic green sheet. The construction of the plate press is not limited. The pair of parallel plates is preferably constructed so that the surface of the sheet can be heated.

As the conditions for smoothing by the plate pressing method, it is important to appropriately control the surface temperature of the parallel plates, and the pressing pressure. The surface temperature and the pressing pressure are preferably controlled to the range of about 0 to 150° C. and the range of about 500 to 10,000 kgf/cm$^2$, more preferably the range of about 20 to 100° C. and the range of about 1,000 to 6,000 kgf/cm$^2$, respectively.

In smoothing by the plate pressing method, ceramic green sheets may be pressed one by one, or a plurality of sheets may be stacked and pressed. However, in order to prevent the ceramic green sheet from adhering to the pressing plates, the processed surface of a film subjected to separation processing is preferably attached to the surface of a ceramic green sheet, followed by pressing. In pressing a plurality of ceramic green sheets, in order to prevent each ceramic green sheet from adhering to the carrier film superposed thereon, the processed surface of a film subjected to separation processing is preferably attached to the surface of each ceramic green sheet, or a carrier film on the back of which is subjected to separation processing, is preferably used.

The hydrostatic pressing method uses a hydrostatic press comprising, for example, a pressure container filled with a liquid such as oil or water, a pressure cylinder for pressurizing the surface of the liquid, and a control for controlling the pressure applied to the liquid surface for smoothing the ceramic green sheet. The hydrostatic press is preferably provided with a liquid temperature control for controlling the temperature of the liquid such as oil or water to a predetermined temperature.

As the conditions for smoothing by the hydrostatic pressing method, it is important to appropriately control the liquid temperature (the surface temperature of the ceramic green sheet) and the pressing pressure. The liquid temperature and the pressing pressure are preferably controlled to the range of about 0 to 150° C. and the range of about 500 to 10,000 kgf/cm$^2$, more preferably the range of about 20 to 100° C. and the range of about 1,000 to 6,000 kgf/cm$^2$, respectively.

In smoothing the ceramic green sheet by the hydrostatic pressing method, for example, the ceramic green sheet is wound on the surface of a mirror-polished metal roll, packed with a flexible sheet under vacuum, and then immersed in the liquid such as oil or water of the hydrostatic press, followed by hydrostatic pressing. As a result, the ceramic green sheet is pressed on the surface of the metal roll and the film on the back of the ceramic green sheet under uniform pressure to smooth the surface of the ceramic green sheet.

In the method of manufacturing a multilayer ceramic electronic part of the present invention, the step of forming the sheet provided with an electrode comprises the step of coating electrode paste on the ceramic green sheet subjected to the smoothing process, and then drying the coating, and the step of coating ceramic paste containing a ceramic powder, a binder and a solvent on a region (sheet portion) of the electrode paste-coated surface, in which the electrode paste is not coated, and then drying the coating.

In a case in which only the electrode paste is coated on the ceramic green sheet (i.e., the ceramic paste is not coated on the region (sheet portion) of the ceramic green sheet, in which the electrode paste is not coated), the following problems occur in some cases:

(1) A step of about 1 μm per layer occurs in the region between the electrode paste-coated portion and the uncoated portion, and thus lamination of hundreds of ceramic green sheets causes a step of about 100 to 500 μm in the entire lamination. This step brings about bending of an extraction electrode portion for connecting an internal electrode and external electrode in the step of pressing the lamination, thereby causing a short-circuit defect; and (2) The step causes distortion of the structure of a capacitor, thereby easily causing delamination during burning.

However, in the present method of manufacturing a multilayer ceramic electronic part, the ceramic paste is coated on the region (sheet portion) of the ceramic green sheet in which the electrode paste is not coated, and then dried to form the ceramic green sheet, without forming the above step. Therefore, it is possible to decrease the structural defects of the multilayer ceramic electronic part, such as short-circuit defects, delamination, etc. It is also possible to prevent breakage of the internal electrodes due to the step, thereby improving reliability.

The method of manufacturing a multilayer ceramic electronic part further comprises smoothing (secondary smoothing) the ceramic green sheet subjected to the smoothing process (primary smoothing) after the electrode paste and the ceramic paste are coated thereon and dried.

After the electrode paste and the ceramic paste are coated on the ceramic green sheet subjected to the smoothing process (primary smoothing) and dried, the ceramic green sheet is further smoothed (secondary smoothing), thereby removing print deviation, coating waviness during printing and a saddle phenomenon. Therefore, surfaces of the electrode paste coating and the ceramic paste coating can be further smoothed, and the densities thereof can be increased. As a result, the smoothness of the interfaces between the internal electrodes and the ceramic layers in the multilayer ceramic electronic part can be improved to improve pressure resistance. Also, the occurrence of structural defects (delamination, bending of an electrode portion, etc.), which are easily produced in multilayer films, can be suppressed and prevented to effectively manufacture the multilayer ceramic electronic part having high reliability.

The method further comprising coating the ceramic paste and performing the secondary smoothing process is particularly useful for manufacturing a multilayer ceramic electronic part in which the thickness (element thickness) of each of the ceramic layers is 3 μm or less. For example, in application to the manufacture of a large-capacity small monolithic ceramic capacitor comprising a multilayer film, a monolithic ceramic capacitor having excellent electric properties and light reliability can be efficiently manufactured.

In the method of manufacturing a multilayer ceramic electronic part of the present invention, the secondary smoothing process is performed by any one of the calender roll method, the plate pressing method and the hydrostatic pressing method.

By using any one of the calender roll method, the plate pressing method and the hydrostatic pressing method for the secondary smoothing process, the surfaces of the electrode paste coating and the ceramic paste coating applied to the surface of the ceramic green sheet are securely smoothed to improve the smoothness of the whole sheet provided with an electrode, thereby making the present invention more effective.

BRIEF DESCRIPTION OF THE DRAWINGS

FIGS. 4A to 4C are drawings showing a method of manufacturing a multilayer ceramic electronic part of the present invention, in which FIG. 4A is a perspective view showing a ceramic green sheet formed in a step, FIG. 4B is a perspective view showing the ceramic green sheet coated with electrode paste, and FIG. 4C is a perspective view showing a sheet provided with an electrode, which is formed by coating ceramic paste on a region of the ceramic green sheet, in which the electrode paste is not coated.

DESCRIPTION OF THE PREFERRED EMBODIMENTS

Figure 1:
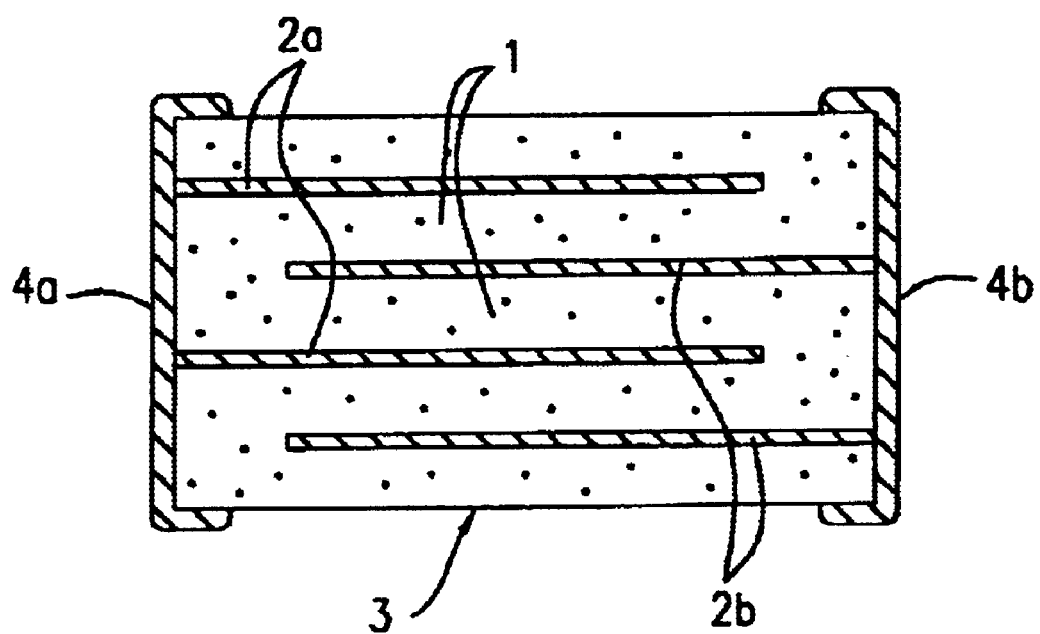
FIG. 1 is a sectional view showing the structure of a monolithic ceramic capacitor.
Figure 2:
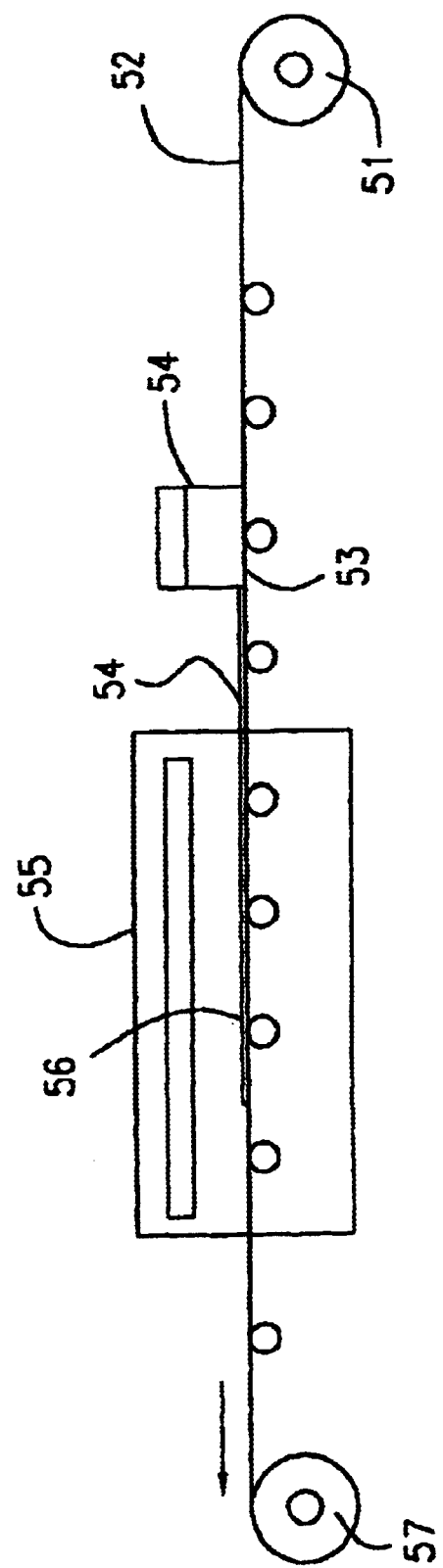
FIG. 2 is a drawing showing a conventional method of producing a ceramic green sheet.

The characteristics of the present invention are described in detail below with reference to embodiments.

First Embodiment

In this embodiment, the production of a ceramic green sheet used for forming a dielectric layer of a monolithic ceramic capacitor is described as an example.

(1) First, as starting raw materials, predetermined amounts of a ceramic powder (barium titanate ceramic powder) and additives for improving properties were weighed and mixed in a wet manner to form a mixed powder. Each of the additives was added in the form of oxide power or carbonated powder to the ceramic powder, and the resultant mixture was wet-dispersed in an organic solvent (dispersion solvent).

As the method of wet dispersion (primary dispersion), a dispersion method or dispersion conditions are preferably selected in which the ceramic powder is not ground. Namely, dispersion is preferably performed under conditions which produce shear force at a level causing no grinding.

Examples of the dispersion method include a ball mill method, a sand mill method, a visco mill method, a high-pressure homogenizer method, a kneader dispersion method and the like.

(2) Next, an organic binder, a plasticizer and an organic solvent (dispersion medium) were added to the primary dispersed solution to prepare ceramic slurry, followed by secondary dispersion by the same method as the above primary dispersion method.

(3) Then, the ceramic slurry was formed as a sheet on a carrier film. As the method of forming the ceramic slurry in sheet form, various known methods such as a doctor blade method, a reverse roll coater method, a die coater method and the like can be used.

The thus-produced ceramic green sheet passed through the dispersion process and the forming process need not have surface roughness (Ra) with which particles are highly dispersed as single particles, but it is rather important that the ceramic powder is not ground.

(4) Next, smoothing was performed for smoothing the surface of the ceramic green sheet.

In this embodiment, smoothing was performed by each of the plate pressing method, the hydrostatic pressing method and the calender roll method to produce ceramic green sheets (samples) subjected to different smoothing methods.

This embodiment used the plate press comprising a pair of parallel plates (pressing plates) each having a mirror-polished hard chromium plated layers provided on the surface thereof, a pressure control for controlling the pressing pressure of the pressing plates, and a heater for heating the pair of the pressing plates to a predetermined temperature and maintaining the plates at the predetermined temperature.

The hydrostatic press used comprised a pressure container filled with a liquid, a pressure cylinder for pressurizing the liquid, a control for controlling pressure, a heater for heating the liquid to a predetermined temperature and maintaining the liquid at the predetermined temperature, and a metal roll having a mirror-polished surface on which the ceramic green sheet was wound. The ceramic green sheet was wound on the surface of the metal roll, packed with a flexible sheet under vacuum, and then immersed in the liquid of the hydrostatic press, followed by hydrostatic pressing.

The calender roll used was a single nip roll-type calender roll comprising a pair of nip rolls (metal rolls), a heater comprising a temperature control mechanism for heating the nip rolls to a predetermined temperature, and a pressure control for controlling pressing pressure (linear pressure) in pressurizing the ceramic green sheet held between the nip rolls from both sides thereof. However, a multi-state nip roll type calender roll comprising plural pairs of nip rolls can also be used.

(5) Then, the surface roughness of the ceramic green sheets after smoothing by the above-described plate pressing method, hydrostatic pressing method and calender roll method were measured. The surface roughness of each of the ceramic green sheets was measured by the atomic force microscope, and evaluated on the basis of Ra value of a region of 5 μm square.

As comparative examples, barium titanate powders having an average particle diameter of 210 nm (Comparative Example 1), an average particle diameter of 153 nm (Comparative Example 2) and an average particle diameter of 98 nm (Comparative example 3) were used as ceramic powders for preparing ceramic slurry. The thus-prepared ceramic slurry was formed in a sheet on a carrier film, and then dried to produce a ceramic green sheet (a ceramic green sheet not subjected to smoothing process). Table 1 shows the surface roughness (Ra) of each of the thus-produced ceramic green sheets.

TABLE 1

| Sample No. | Average Particle Diameter of Ceramic Powder (nm) | Surface Roughness (Ra) (nm) |
| --- | --- | --- |
| Comparative Example 1 | 210 | 228 |
| Comparative Example 2 | 153 | 162 |
| Comparative Example 3 | 98 | 120 |

The ceramic green sheets of Comparative Examples 1, 2 and 3 in which the surfaces were not subjected to smoothing process have surface roughness (Ra) values of 228 nm, 162 nm and 120 nm, respectively.

Tables 2 and 3 show the surface roughness (Ra) of ceramic green sheets subjected to smoothing process (plate pressing) using the plate press while changing the pressing temperature (pressing plate surface temperature) and the pressing pressure.

TABLE 2

| Sample No. | Average Particle Diameter of Ceramic Powder (nm) | Pressing Temperature (° C.) | Pressing Pressure (kgf/cm²) | Surface Roughness (Ra) (nm) |
| --- | --- | --- | --- | --- |
| 1 | 210 | 0 | 2,000 | 211 |
| 2 | 210 | 0 | 5,000 | 208 |
| 3 | 210 | 0 | 10,000 | 200 |
| 4* | 210 | 20 | 200 | 228 |
| 5 | 210 | 20 | 500 | 192 |
| 6 | 210 | 20 | 1,000 | 110 |
| 7 | 210 | 20 | 4,000 | 80 |
| 8 | 210 | 20 | 6,000 | 72 |
| 9 | 210 | 20 | 10,000 | 165 |
| 10* | 210 | 20 | 12,000 | x |
| 11 | 210 | 60 | 500 | 161 |
| 12 | 210 | 60 | 4,000 | 70 |
| 13 | 210 | 100 | 3,000 | 90 |
| 14 | 210 | 100 | 6,000 | 72 |
| 15 | 210 | 100 | 8,000 | 131 |
| 16* | 210 | 100 | 11,000 | x |
| 17 | 210 | 125 | 6,000 | 141 |
| 18 | 210 | 150 | 500 | 170 |
| 19 | 210 | 150 | 10,000 | 176 |
| 20* | 210 | 180 | 2,000 | x |

TABLE 3

| Sample No. | Average Particle Diameter of Ceramic Powder (nm) | Pressing Temperature (° C.) | Pressing Pressure (kgf/cm²) | Surface Roughness (Ra) (nm) |
| --- | --- | --- | --- | --- |
| 21* | 153 | 50 | 200 | 151 |
| 22 | 153 | 50 | 500 | 128 |
| 23 | 153 | 50 | 1,000 | 86 |
| 24 | 153 | 50 | 4,000 | 35 |
| 25 | 153 | 50 | 6,000 | 38 |
| 26 | 153 | 50 | 10,000 | 108 |
| 27* | 153 | 50 | 12,000 | x |
| 28 | 153 | 0 | 3,000 | 145 |
| 29 | 153 | 20 | 3,000 | 100 |
| 30 | 153 | 70 | 3,000 | 37 |
| 31 | 153 | 120 | 3,000 | 106 |
| 32* | 153 | 170 | 3,000 | x |
| 33 | 98 | 70 | 3,000 | 42 |
| 34 | 98 | 70 | 6,000 | 46 |
| 35 | 98 | 70 | 9,000 | 93 |
| 36* | 98 | 70 | 12,000 | x |

Tables 4 and 5 show the surface roughness of ceramic green sheets subjected to smoothing process (hydrostatic pressing) using the hydrostatic press while changing the pressing temperature (liquid temperature) and the pressing pressure.

TABLE 4

| Sample No. | Average Particle Diameter of Ceramic Powder (nm) | Pressing Temperature (° C.) | Pressing Pressure (kgf/cm²) | Surface Roughness (Ra) (nm) |
|---|---|---|---|---|
| 101 | 210 | 0 | 2,000 | 221 |
| 102 | 210 | 0 | 5,000 | 218 |
| 103 | 210 | 0 | 10,000 | 190 |
| 104* | 210 | 20 | 200 | 228 |
| 105 | 210 | 20 | 500 | 197 |
| 106 | 210 | 20 | 1,000 | 150 |
| 107 | 210 | 20 | 4,000 | 93 |
| 108 | 210 | 20 | 6,000 | 75 |
| 109 | 210 | 20 | 10,000 | 161 |
| 110* | 210 | 20 | 12,000 | x |
| 111 | 210 | 60 | 500 | 163 |
| 112 | 210 | 60 | 4,000 | 67 |
| 113 | 210 | 100 | 3,000 | 98 |
| 114 | 210 | 100 | 6,000 | 68 |
| 115 | 210 | 100 | 8,000 | 142 |
| 116* | 210 | 100 | 11,000 | x |
| 117 | 210 | 125 | 6,000 | 151 |
| 118 | 210 | 150 | 500 | 174 |
| 119 | 210 | 150 | 10,000 | 172 |
| 120* | 210 | 180 | 2,000 | x |

TABLE 5

| Sample No. | Average Particle Diameter of Ceramic Powder (nm) | Pressing Temperature (° C.) | Pressing Pressure (kgf/cm²) | Surface Roughness (nm) |
|---|---|---|---|---|
| 121* | 153 | 50 | 200 | 157 |
| 122 | 153 | 50 | 500 | 138 |
| 123 | 153 | 50 | 1,000 | 85 |
| 124 | 153 | 50 | 4,000 | 38 |
| 125 | 153 | 50 | 6,000 | 40 |
| 126 | 153 | 50 | 10,000 | 102 |
| 127* | 153 | 50 | 12,000 | x |
| 128 | 153 | 0 | 3,000 | 142 |
| 129 | 153 | 20 | 3,000 | 62 |
| 130 | 153 | 70 | 3,000 | 45 |
| 131 | 153 | 120 | 3,000 | 98 |
| 132* | 153 | 170 | 3,000 | x |
| 133 | 98 | 70 | 3,000 | 45 |
| 134 | 98 | 70 | 6,000 | 52 |
| 135 | 98 | 70 | 9,000 | 93 |
| 136* | 98 | 70 | 12,000 | x |

Tables 6 and 7 show the surface roughness (Ra) of ceramic green sheets subjected to smoothing process (calendering) using the calender roll while changing the pressing temperature (nip roll surface temperature) and the pressing pressure.

TABLE 6

| Sample No. | Average Particle Diameter of Ceramic Powder (nm) | Pressing Temperature (° C.) | Pressing Pressure (kgf/cm²) | Surface Roughness (Ra) (nm) |
|---|---|---|---|---|
| 201 | 210 | 0 | 200 | 212 |
| 202 | 210 | 0 | 500 | 191 |
| 203 | 210 | 0 | 1000 | 183 |
| 204* | 210 | 20 | 20 | 228 |
| 205 | 210 | 20 | 50 | 198 |
| 206 | 210 | 20 | 100 | 120 |
| 207 | 210 | 20 | 400 | 83 |
| 208 | 210 | 20 | 600 | 79 |
| 209 | 210 | 20 | 1,000 | 185 |
| 210* | 210 | 20 | 1,200 | x |
| 211 | 210 | 60 | 50 | 168 |
| 212 | 210 | 60 | 400 | 77 |
| 213 | 210 | 100 | 300 | 98 |
| 214 | 210 | 100 | 600 | 73 |
| 215 | 210 | 100 | 800 | 142 |
| 216* | 210 | 100 | 1,100 | x |
| 217 | 210 | 125 | 600 | 152 |
| 218 | 210 | 150 | 50 | 179 |
| 219 | 210 | 150 | 1000 | 189 |
| 220* | 210 | 180 | 200 | x |

TABLE 7

| Sample No. | Average Particle Diameter of Ceramic Powder (nm) | Pressing Temperature (° C.) | Pressing Pressure (kgf/cm²) | Surface Roughness (nm) |
|---|---|---|---|---|
| 221* | 153 | 50 | 20 | 162 |
| 222 | 153 | 50 | 50 | 138 |
| 223 | 153 | 50 | 100 | 90 |
| 224 | 153 | 50 | 400 | 32 |
| 225 | 153 | 50 | 600 | 33 |
| 226 | 153 | 50 | 1,000 | 119 |
| 227* | 153 | 50 | 1,200 | x |
| 228 | 153 | 0 | 300 | 150 |
| 229 | 153 | 20 | 300 | 92 |
| 230 | 153 | 70 | 300 | 25 |
| 231 | 153 | 120 | 300 | 107 |
| 232* | 153 | 170 | 300 | x |
| 233 | 98 | 70 | 300 | 24 |
| 234 | 98 | 70 | 600 | 26 |
| 235 | 98 | 70 | 900 | 84 |
| 236* | 98 | 70 | 1,200 | x |

In Tables 2, 3, 4, 5, 6 and 7, the sample numbers marked with * are out of the range of the present invention (reference examples). In the column of surface roughness (Ra), the mark x denotes the occurrence of breakage of a ceramic green sheet.

Surface Roughness (Ra) in Smoothing by the Plate Pressing Method (a) Use of Ceramic Powder Having a Particle Diameter of 210 nm (Refer to Table 2)

Each of Sample Nos. 1 to 20 used a ceramic powder having an average particle diameter of 210 nm. The ceramic green sheet (not subjected to smoothing process) of Comparative Example 1 (Table 1) using a ceramic powder having an average particle diameter of 210 nm exhibited Ra of 228 nm.

Of the ceramic green sheets using a ceramic powder having an average particle diameter of 210 nm, the ceramic green sheets of Sample Nos. 1 to 3 were subjected to smoothing process (plate pressing) at a pressing temperature of 0° C. In these ceramic green sheets, even if the pressing pressure was changed, the Ra decreasing effect was small because of the low pressing temperature.

Sample Nos. 4 to 10 were subjected to smoothing process (plate pressing) at a pressing temperature of 20° C.

Sample No. 4 was a reference example in which the pressing pressure was 200 kgf/cm² lower than the range of the present invention, and the Ra decreasing effect was not observed because of the pressing pressure of less than 500 kgf/cm².

In Sample Nos. 5 to 9, the pressing pressure was 500 to 10,000 kgf/cm², and the Ra decreasing effect was observed. Particularly, in a case in which the pressing pressure was 1,000 to 6,000 kgf/cm², like in Samples Nos. 6 to 8, a great Ra decreasing effect was observed.

In Sample No. 9, the Ra decreasing effect was great because the pressing pressure was as high as 10,000 kgf/cm², but some wrinkle patterns were produced on the ceramic green sheet.

In Sample No. 10 (reference example), the pressing pressure exceeded 10,000 kgf/cm², and the sheet separated from the carrier film and was broken.

In Sample Nos. 11 and 12, the pressing temperature was 60° C., and the pressing pressures are 500 kgf/cm² and 4,000 kgf/cm², respectively. It was found that Sample No. 12 in which the pressing pressure was in the more preferable range exhibited the greater Ra decreasing effect.

In Sample Nos. 13 to 16, the pressing temperature was 100° C. It was found that the greatest Ra decreasing effect was obtained in the range of pressing pressures of 1,000 to 6,000 kgf/cm².

In Sample No. 16 (reference example), the ceramic green sheet was separated from the carrier film and broken because the pressing pressure exceeded 10,000 kgf/cm².

In Sample Nos. 17 to 19, the pressing temperature and pressing pressure were in the more preferable ranges, and the Ra decreasing effect was observed.

In Sample No. 20 (reference example), the pressing pressure was in the preferable range, but the sheet was separated from the carrier film and broken because the temperature exceeds 150° C.

(b) Use of Ceramic Powder Having Particle Diameter of 153 nm (Refer to Table 3)

In Sample Nos. 21 to 35, the ceramic powder had an average particle diameter of 153 nm. The ceramic green sheet (not subjected to smoothing process) of Comparative Example 2 (Table 1) using the ceramic powder having an average particle diameter of 153 nm exhibited Ra of 162 nm.

In Sample Nos. 21 to 27, the pressing pressure was changed at a pressing temperature of 50° C.

Sample No. 21 (reference example) was a reference example in which the pressing pressure was 200 kgf/cm² lower than the pressing pressure range of the present invention, and thus a sufficient Ra decreasing effect was not observed because the pressing pressure was less than 500 kgf/cm².

In Sample Nos. 22 to 26, the pressing pressures were in the range of the present invention, and thus the Ra decreasing effect was observed. Particularly, in Sample Nos. 23 to 25, the pressing pressures were in the more preferable condition range, and it was thus found that the surface roughness Ra could be decreased to 100 nm or less. An electron microscope photograph of the surface of the ceramic green sheet of Sample No. 24 indicates that the structure is densified, as compared with the ceramic green sheet of Comparative Example 2.

In Sample No. 27 (reference example), the pressing temperature of 50° C. was in the preferable range, while the pressing pressure exceeded 10000 kgf/cm². Thus, the ceramic green sheet was separated from the carrier film and broken.

In Sample Nos. 28 to 32, the pressing temperature was changed at a pressing pressure of 3,000 kgf/cm².

In Sample Nos. 28 to 31, the pressing temperature was in the condition range of the present invention, and the Ra decreasing effect was observed. Particularly, in Samples Nos. 29 and 30, a more sufficient Ra decreasing effect was exhibited.

In Sample No. 32 (reference example), the pressing pressure of 3,000 kgf/cm² was in the preferable range while the temperature exceeded 150° C., thereby causing separation of the sheet.

(c) Use of Ceramic Powder Having an Average Particle Diameter of 98 nm (Refer to Table 3)

In Sample Nos. 33 to 36, the ceramic powders have an average particle diameter of 98 nm. The ceramic green sheet (not subjected to smoothing process) of Comparative Example 3 (Table 1) using the ceramic powder having an average particle diameter of 98 nm exhibits Ra of 120 nm.

In Sample Nos. 33 to 35, the pressing temperatures and the pressing pressures were in the preferred ranges, and thus the effect of decreasing Ra of the ceramic green sheets was observed. In Sample Nos. 33 and 34, better results were exhibited.

However, in Sample No. 36 (reference example), the pressing pressure exceeded 10000 kgf/cm², and thus the ceramic green sheet was separated.

It is confirmed by above-described results that as conditions (pressing conditions) for smoothing by the plate pressing method, the pressing temperature and the pressing pressure are preferably in the range of about 0 to 150° C. and about 500 to 10,000 kgf/cm², respectively, and in the ranges, the effect of decreasing Ra of the ceramic green sheet can be obtained.

It is also found that with a pressing temperature of about 20 to 100° C., and a pressing pressure of about 1,000 to 6,000 kgf/cm², a greater Ra decreasing effect can be obtained.

Surface Roughness (Ra) in Smoothing by the Hydrostatic Pressing Method (a) Use of Ceramic Powder Having an Average Particle Diameter of 210 nm (Refer to Table 4)

Samples Nos. 101 to 120 use a ceramic powder having an average particle diameter of 210 nm. The ceramic green sheet (not subjected to smoothing process) of Comparative Example 1 (Table 1) using the ceramic powder having an average particle diameter of 210 nm exhibits Ra of 228 nm.

Of the ceramic green sheets using the ceramic powder having an average particle diameter of 210 nm, the ceramic green sheets of Sample Nos. 101 to 103 were subjected to smoothing process (hydrostatic pressing) at a pressing temperature of 0° C. Even if the pressing pressure was changed, the Ra decreasing effect was inadequate because the pressing temperature was low.

In Sample Nos. 104 to 110, smoothing (hydrostatic pressing) was performed at a pressing temperature of 20° C.

Sample No. 104 was a reference example in which the pressing pressure was 200 kgf/cm² lower than the range of the present invention, and thus the Ra decreasing effect was not observed because the pressing pressure was less than about 500 kgf/cm².

In Sample Nos. 105 to 109, the pressing pressure was 500 to 10,000 kgf/cm², and the Ra decreasing effect was observed. Particularly in cases in which the pressing pressure was 1,000 to 6,000 kgf/cm², as in Sample Nos. 106 to 108, a great Ra decreasing effect was observed.

In Sample No. 109, since the pressing pressure was as high as 10,000 kgf/cm², the great Ra decreasing effect was observed, while some wrinkle patterns occurred on the ceramic green sheet.

In Sample No. 110 (reference example), the pressing pressure exceeded 10,000 kgf/cm², and the sheet separated from the carrier film, and was broken.

In Sample Nos. 111 and 112, the pressing temperature was 60° C. The pressing pressures were respectively 500 kgf/cm² and 4,000 kgf/cm², and a greater Ra decreasing effect was observed in Sample No. 112 in which the pressing pressure was in the more preferable range.

In Sample Nos. 113 to 116, the pressing temperature was 100° C. It was found that a greater Ra decreasing effect was obtained in the pressing pressure range of 1,000 to 6,000 kgf/cm².

In Sample No. 116 (reference example), the pressing pressure exceeded 10000 kgf/cm², and the ceramic green sheet separated from the carrier film, and was broken.

In Sample Nos. 117 to 119, the pressing temperatures and pressing pressures were in the more preferable ranges, and thus the Ra decreasing effect was observed.

In Sample No. 120 (reference example), the pressing pressure was in the preferred range while the temperature exceeded 150° C., thereby causing separation of the ceramic green sheet from the carrier film, and breakage thereof.

(b) Use of Ceramic Powder Having an Average Particle Diameter of 153 nm (Refer to Table 5)

In Sample Nos. 121 to 132, the ceramic powders have an average particle diameter of 153 nm. The ceramic green sheet (not subjected to smoothing process) of Comparative Example 2 (Table 1) using the ceramic powder having an average particle diameter of 153 nm exhibits Ra of 162 nm.

In Sample Nos. 121 to 127, the pressing pressure was changed at a pressing temperature of 50° C.

In Sample No. 121 (reference example), the pressing pressure was 200 kgf/cm² lower than the range of the present invention, and thus the sufficient Ra decreasing effect was not observed because the pressing pressure was less than about 500 kgf/cm².

In Sample Nos. 122 to 126, the pressing pressures were in the condition range of the present invention, and the Ra decreasing effect was observed. Particularly, in Sample Nos. 123 to 125, the pressing pressures were in the more preferable range, and it was thus found that the surface roughness Ra could be decreased to 100 nm or less.

In Sample No. 127 (reference example), the pressing temperature of 50° C. was in the preferred range while the pressing pressure exceeded 10,000 kgf/cm², thereby causing separation of the ceramic green sheet from the carrier film, and breakage thereof.

In Sample Nos. 128 to 132, the pressing temperature was changed at the pressing pressure of 3,000 kgf/cm².

In Sample Nos. 128 to 131, the pressing temperature was in the condition range of the present invention, and thus the Ra decreasing effect was observed.

Particularly, in Samples Nos. 129 and 130, a more sufficient Ra decreasing effect was exhibited.

In Sample No. 132 (reference example), the pressing pressure of 3000 kgf/cm² was in the preferred range while the temperature exceeded 150C., thereby causing separation of the sheet.

(c) Use of Ceramic Powder Having an Average Particle Diameter of 98 nm (Refer to Table 5)

In Sample Nos. 133 to 136, the ceramic powders had an average particle diameter of 98 nm. The ceramic green sheet (not subjected to smoothing process) of Comparative Example 3 (Table 1) using the ceramic powder having an average particle diameter of 98 nm exhibited Ra of 120 nm.

In Sample Nos. 133 to 136, the pressing pressure was changed at a pressing temperature of 70° C.

In Sample Nos. 133 to 135, the pressing temperatures and pressing pressures were in the preferred ranges, and the effect of decreasing Ra of the ceramic green sheet was observed. In Sample Nos. 133 and 134, better results were exhibited.

However, in Sample No. 136 (reference example), the sheet was separated because the pressing pressure exceeded 10000 kgf/cm².

The above-described results indicate that with a pressing temperature of about 0 to 150° C. and a pressing pressure of about 500 to 10,000 kgf/cm² as conditions (pressing conditions) for smoothing by the hydrostatic pressing method, the effect of decreasing Ra of the ceramic green sheet can be obtained.

It is also found that with a pressing temperature of about 20 to 100° C. and a pressing pressure of about 1,000 to 6,000 kgf/cm², a greater Ra decreasing effect is obtained.

Surface Roughness (Ra) in Smoothing by the Calendering Method (a) Use of Ceramic Powder Having an Average Particle Diameter of 21 nm (Refer to Table 6)

Samples Nos. 201 to 220 used ceramic powders having an average particle diameter of 210 rm. The ceramic green sheet (not subjected to smoothing process) of Comparative Example 1 (Table 1) using the ceramic powder having an average particle diameter of 210 nm exhibited Ra of 228 nm.

Of the ceramic green sheets using the ceramic powders having an average particle diameter of 210 nm, the ceramic green sheets of Sample Nos. 201 to 203 were subjected to smoothing process (calendering) at a pressing temperature (nip roll surface temperature) of 0° C. Even if the pressing pressure was changed, the Ra decreasing effect was inadequate because the pressing temperature was low.

In Sample Nos. 204 to 210, smoothing (calendering) was performed at a pressing temperature of 20° C.

Sample No. 204 was a reference example in which the pressing pressure (linear pressure) was 20 kgf/cm lower than the range of the present invention, and thus the Ra decreasing effect was not observed because the pressing pressure was less than about 50 kgf/cm.

In Sample Nos. 205 to 209, the pressing pressure (linear pressure) was 50 to 1000 kgf/cm, and the Ra decreasing effect was observed. Particularly in cases in which the pressing pressure (linear pressure) was 100 to 600 kgf/cm, as in Sample Nos. 206 to 208, a great Ra decreasing effect was observed.

In Sample No. 209, since the pressing pressure (linear pressure) was as high as 1,000 kgf/cm, a great Ra decreasing effect was observed, while some wrinkle patterns occurred on the ceramic green sheet.

In Sample No. 210 (reference example), the pressing pressure (linear pressure) exceeded 1000 kgf/cm, and the sheet separated from the carrier film, and was broken.

In Sample Nos. 211 and 212, the pressing temperature was 60° C. The pressing pressures (linear pressure) were respectively 50 kgf/cm and 400 kgf/cm, and a greater Ra decreasing effect was observed in Sample No. 212 in which the pressing pressure (linear pressure) was in the more preferable range.

In Sample Nos. 213 to 216, the pressing temperature was 100° C. It was found that a greater Ra decreasing effect was obtained in the pressing pressure (linear pressure) range of 100 to 600 kgf/cm.

In Sample No. 216 (reference example), the pressing pressure (linear pressure) exceeded 1000 kgf/cm, and the ceramic green sheet separated from the carrier film, and was broken.

In Sample Nos. 217 to 219, the pressing temperatures and pressing pressures (linear pressure) were in the more preferable ranges, and thus the Ra decreasing effect was observed.

In Sample No. 220 (reference example), the pressing pressure (linear pressure) was in the preferred range while the temperature exceeded 150° C., thereby causing separation of the ceramic green sheet from the carrier film, and breakage thereof.

(b) Use of Ceramic Powder Having an Average Particle Diameter of 153 nm (Refer to Table 7)

In Sample Nos. 221 to 232, the ceramic powders had an average particle diameter of 153 nm. The ceramic green sheet (not subjected to smoothing process) of Comparative Example 2 (Table 1) using the ceramic powder having an average particle diameter of 153 nm exhibited Ra of 162 nm.

In Sample Nos. 221 to 227, the pressing pressure (linear pressure) was changed at a pressing temperature of 50° C.

In Sample No. 221 (reference example), the pressing pressure (linear pressure) was 20 kgf/cm lower than the range of the present invention, and thus the sufficient Ra decreasing effect was not observed because the pressing pressure was less than about 50 kgf/cm.

In Sample Nos. 222 to 226, the pressing pressures (linear pressure) were in the condition range of the present invention, and the Ra decreasing effect was observed. Particularly, in Sample Nos. 223 to 225, the pressing pressures (linear pressure) were in the more preferable range, and it was thus found that the surface roughness Ra could be decreased to 100 nm or less.

In Sample No. 227 (reference example), the pressing temperature of 50° C. was in the preferred range while the pressing pressure (linear pressure) exceeded 1000 kgf/cm, thereby causing separation of the ceramic green sheet from the carrier film, and breakage thereof.

In Sample Nos. 228 to 232, the pressing temperature was changed at the pressing pressure (linear pressure) of 300 kgf/cm.

In Sample Nos. 228 to 231, the pressing temperature was in the condition range of the present invention, and thus the Ra decreasing effect was observed. Particularly, in Samples Nos. 229 and 230, the more sufficient Ra decreasing effect was exhibited.

In Sample No. 232 (reference example), the pressing pressure (linear pressure) of 300 kgf/cm was in the preferred range while the temperature exceeded 150° C., thereby causing separation of the sheet.

(c) Use of Ceramic Powder Having an Average Particle Diameter of 98 nm (Refer to Table 5)

In Sample Nos. 233 to 236, the ceramic powders had an average particle diameter of 98 nm. The ceramic green sheet (not subjected to smoothing process) of Comparative Example 3 (Table 1) using the ceramic powder having an average particle diameter of 98 nm exhibited Ra of 120 nm.

In Sample Nos. 233 to 236, the pressing pressure (linear pressure) was changed at a pressing temperature of 70° C.

In Sample Nos. 233 to 235, the pressing temperatures and pressing pressures (linear pressure) were in the preferred ranges, and the effect of decreasing Ra of the ceramic green sheet was observed. In Sample Nos. 233 and 234, more sufficient results were exhibited.

However, in Sample No. 236 (reference example), the sheet was separated because the pressing pressure (linear pressure) exceeded about 1,000 kgf/cm.

The above-described results indicate that with a nip roll surface temperature of about 0 to 150° C. and a pressing pressure (linear pressure) of about 50 to 1,000 kgf/cm as conditions (pressing conditions) for smoothing by the calender roll, the effect of decreasing Ra of the ceramic green sheet can be obtained.

It is also found that with a nip roll surface temperature of about 20 to 100° C. and a pressing pressure (linear pressure) of about 100 to 600 kgf/cm, the greater Ra decreasing effect is obtained.

In the above-described embodiment, examples using a barium titanate ceramic powder as the ceramic powder which constitutes a ceramic green sheet is described. However, in the present invention, the ceramic powder is not limited to this, and the present invention can be widely applied to cases in which ceramic green sheets are formed by using various ceramic powders respectively comprising strontium titanate, calcium titanate and the like as main components.

Although examples using an organic slurry as ceramic slurry containing the ceramic powder are described above, the use of aqueous slurry produces the same effects as the above.

In addition, a ceramic slurry containing any of various binders, plasticizer, etc, can be used as the ceramic slurry, and the type and amount of the ceramic slurry can be appropriately selected according to the intended ceramic green sheet.

As described above, the method of producing a ceramic green sheet of the present invention comprises plate-pressing a dry sheet (a ceramic green sheet not subjected to smoothing process), which is obtained by forming ceramic slurry in a sheet on a carrier film and then drying, for each carrier film by using a plate press under conditions of a pressing plate surface temperature of about 0 to 150° C. and a pressing pressure of about 500 to 10,000 kgf/cm$^2$, and thus the surface smoothness of a ceramic green sheet can be improved independently of the particle diameter and dispersibility of ceramic. Therefore, a ceramic green sheet suitable for use for manufacturing a monolithic ceramic capacitor can securely be produced.

In addition, since the density of the ceramic green sheet is increased by smoothing process to suppress the occurrence of internal defects such as pores, and the sheet attack phenomenon in which the solvent component of the electrode paste permeates into the sheet to dissolve the sheet binder in printing the electrode paste on the ceramic green sheet.

Therefore, in manufacturing a multilayer ceramic electronic part such as a monolithic ceramic capacitor by using the ceramic green sheet produced by the producing method of the present invention, a multilayer ceramic electronic part having long life and excellent reliability can be manufactured.

In the present invention, the ceramic green sheet is subjected to the smoothing process, and thus unlike a method for realizing the surface smoothness of the ceramic green sheet by using the high degree of dispersibility of ceramic particles, excessive shear force need not be applied to the ceramic particles during dispersion of ceramic slurry, thereby suppressing and preventing grinding of the ceramic particles. Therefore, it is possible to efficiently prevent the characteristics of the multilayer ceramic electronic part from deviating from the target ranges or the characteristic values from becoming lower than the target characteristic values due to variations in agglomeration with ceramic particle lots. Specifically, for example, in a monolithic ceramic capacitor, it is possible to efficiently prevent the occurrence of the problem in which the design temperature characteristics deviate from the target characteristics or only a capacity value lower than the design capacity can be obtained.

Particularly, the present invention is advantageous for producing a ceramic green sheet for a multilayer ceramic electronic part in which a ceramic layer has a thickness (element thickness) of 3 $\mu$m or less. For example, in application to manufacture of a large-capacity small monolithic ceramic capacitor comprising a multilayer thin film, a monolithic ceramic capacitor having excellent electric properties and high reliability can efficiently be manufactured.

In plate pressing under conditions of a pressing plate surface temperature of about 20 to 100° C. and a pressing pressure of about 1,000 to 6,000 kgf/cm², as in the method of producing a ceramic green sheet of the present invention, the smoothness of the ceramic green sheet can more securely be improved.

In the method of producing a ceramic green sheet of the present invention, the dry sheet (a ceramic green sheet not subjected to smoothing process), which is obtained by forming the ceramic slurry in a sheet on the carrier film and then drying, may be hydrostatically pressed for each carrier film by using the hydrostatic press under conditions of a pressing temperature of about 0 to 150° C. and a pressing pressure of about 500 to 10,000 kgf/cm². In this case, the same effect as the smoothing process by the plate pressing method can be obtained.

In hydrostatic pressing under conditions of a pressing temperature of about 20 to 100° C. and a pressing pressure of about 1,000 to 6,000 kgf/cm², as in the method of producing a ceramic green sheet of the present invention, the smoothness of the ceramic green sheet can more securely be improved.

In the method of producing a ceramic green sheet of the present invention, the dry sheet (a ceramic green sheet not subjected to smoothing process), which is obtained by forming the ceramic slurry in a sheet on the carrier film and then drying, may be calendered for each carrier film by using the calender roll under conditions of a nip roll surface temperature of about 0 to 150° C. and a pressing pressure (linear pressure) of about 50 to 1,000 kgf/cm, and thus the surface smoothness of the ceramic green sheet can be improved independently of the particle diameter and dispersibility of ceramic. Therefore a ceramic green sheet suitable for use for a monolithic ceramic capacitor can securely be produced.

The calender roll method is suitable for continuous processing, and thus permits the continuous process for producing a ceramic green sheet, thereby further improving the production efficiency of the ceramic green sheet.

In calender roll pressing under conditions of a nip roll surface temperature of about 20 to 100° C. and a pressing pressure (linear pressure) of about 100 to 600 kgf/cm, as in the method of producing a ceramic green sheet of the present invention, the smoothness of the ceramic green sheet can more securely be improved.

A multilayer ceramic electronic part in which each of the ceramic layers interposed between internal electrodes has a thickness (element thickness) of 3 $\mu$m or less has the tendency that when the ceramic green sheet used for manufacturing the part has surface roughness (Ra value) of over 100 nm, its lifetime abruptly decreases. By applying the present invention to this case, the surface (Ra value) roughness of a thin ceramic green sheet can be decreased to 100 nm or less, and the durability of the multilayer ceramic electronic part manufactured by using the ceramic green sheet can be improved.

The method of producing a ceramic green sheet of the present invention is particularly useful for producing a thin ceramic green sheet for a multilayer ceramic electronic part required to have excellent surface smoothness. In the forming step of forming ceramic slurry in a sheet, and in the smoothing step of smoothing the surface, the ceramic green sheet is held by the carrier film, while in the lamination step, the ceramic green sheet can be separated from the carrier film. For example, a thin multilayer-type, a multilayer ceramic electronic part or the like can be efficiently manufactured, in which thin ceramic layers are interposed between internal electrodes.

Second Embodiment

Figure 3:
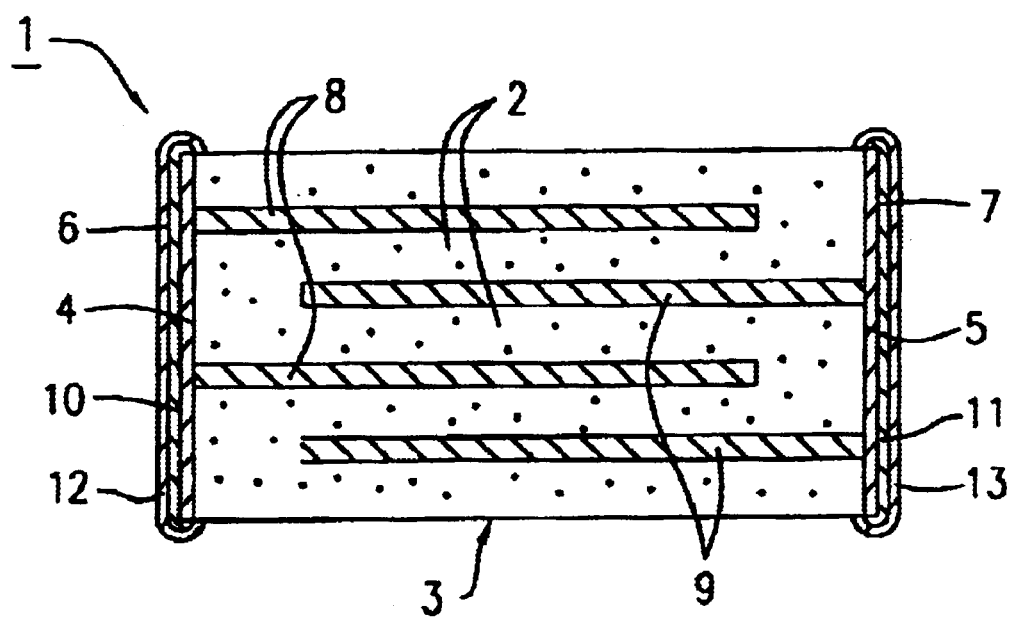
FIG. 3 is a sectional view of a monolithic ceramic capacitor manufactured by a method in accordance with an embodiment of the present invention.

In this embodiment, the manufacture of a monolithic ceramic capacitor having the structure shown in FIG. 3 described.

The monolithic ceramic capacitor 1 shown in FIG. 3 is a chip type monolithic ceramic capacitor having a structure in which a rectangular lamination 3 comprises ceramic layers 2 serving as dielectric layers, and first and second internal electrodes 8 and 9, which are alternately laminated, and first and second external electrodes 6 and 7 are provided on the first and second end surfaces 4 and 5 of the lamination 3 to be connected to the first and second internal electrodes 8 and 9, respectively. On the external electrodes 6 and 7 are formed first plated layers 10 and 11, and second plated layers 12 and 13, respectively.

The method of manufacturing the monolithic ceramic capacitor is described below.

(1) First, as starting raw materials for dielectric ceramic, predetermined amounts of a ceramic raw material powder of barium titanate or the like, and additives for improving properties are weighed and mixed in a wet manner to form a mixed powder. Each of the additives is added in the form of oxide power or carbonated powder to the ceramic raw material powder, and the resultant mixture is wet-dispersed in an organic solvent.

As the method of wet dispersion (primary dispersion), a dispersion method and dispersion conditions are preferably selected in which the ceramic raw material powder is not ground. Examples of the dispersion method include a ball mill method, a sand mill method, a visco mill method, a high-pressure homogenizer method, a kneader dispersion method and the like. As the dispersion conditions, conditions which produce shear force in a level causing no grinding are preferably selected for dispersion.

Figure 4A:
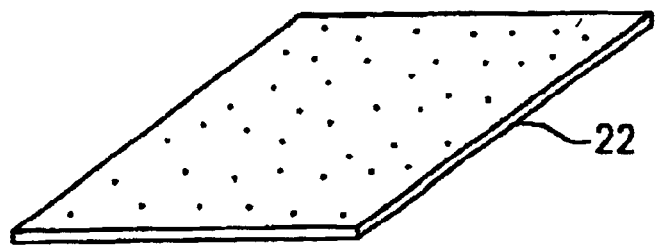

(2) Next, an organic binder, a plasticizer and an organic solvent are added to the primary dispersed solution to prepare ceramic slurry, followed by secondary dispersion by the same method as the above primary dispersion method. By using the thus-prepared ceramic slurry, a ceramic green sheet 22 (FIG. 4A), which constitutes each of the dielectric layers (ceramic layers) 2 of the monolithic ceramic capacitor, is formed on a carrier film comprising a PET film or the like. As the method of forming the ceramic green sheet 22, various known methods such as a doctor blade method, a reverse roll coater method, a die coater method and the like can be used.

The ceramic particles constituting the thus-formed ceramic green sheet need not be highly dispersed as single particles, but it is rather important that the ceramic powder is not ground.

(3) Next, the smoothing process is performed for smoothing the surface of the ceramic green sheet 22 by pressurization.

Specifically, the smoothing process is performed by the method using any one of the calender roll, the plate press and the hydrostatic press to smooth the surface of the ceramic green sheet 22 and improve the density thereof.

Figure 4B:
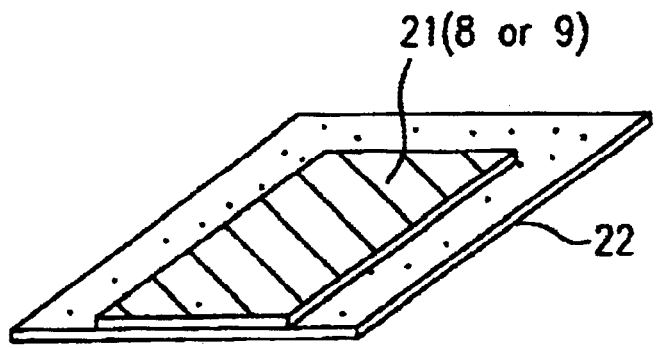

(4) Then, electrode paste 21, which constitutes the internal electrodes 8 or 9, is coated on the predetermined region of the ceramic green sheet 22 subjected to the smoothing process (primary smoothing), as shown in FIG. 4B. As the electrode paste 21, for example, a paste prepared by dispersing a Ni powder, an ethyl cellulose binder, and a solvent such as terpineol by using a three-roll mill, a kneader, a high-pressure homogenizer or the like is used.

Figure 4C:
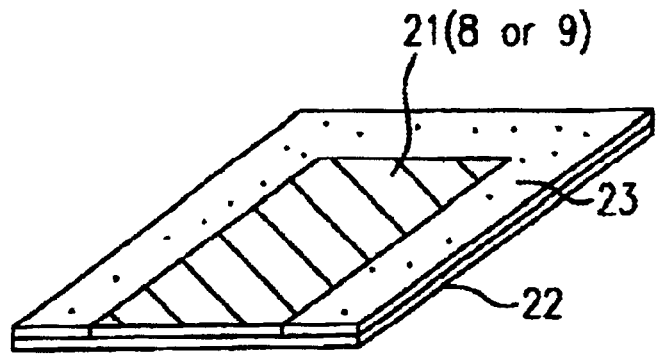

(5) Then, ceramic paste 23 containing ceramic powder, a binder and a solvent is coated on the region (sheet portion) of the electrode paste-coated surface of the ceramic green sheet 22, on which the electrode paste 21 is not coated, to form a smooth state without a step between the region coated with the electrode paste 21 and the region not coated with the electrode paste 21 as shown in FIG. 4C. As the ceramic paste, for example, a paste prepared by dispersing a ceramic powder, an ethyl cellulose (binder), and terpineol (solvent) by using a three-roll mill, kneader, high-pressure homogenizer or the like is used.

(6) Then, the ceramic green sheet 22 coated with the electrode paste 21 and the ceramic paste is further subjected to smoothing process (secondary smoothing) by the calender roll method, the plate pressing method or the hydrostatic pressing method to obtain a sheet provided with an electrode.

(7) A plurality of the thus-formed sheets provide with electrodes (ceramic green sheets having electrodes formed thereon) are laminated, compressed, and then cut according to demand.

As a result, the lamination 3 is obtained in a state wherein the ends of the internal electrodes 8 and 9 are exposed to the end surfaces 4 and 5, respectively.

(8) Then, the lamination 3 is burned in a reducing atmosphere ($N_2$—$H_2$—$H_2O$) to sinter the ceramic.

(9) Then, conductive paste for forming external electrodes is coated on the first and second end surfaces 4 and 5 of the burned lamination 3, and then baked to form the first and second external electrodes 6 and 7 electrically connected to the ends of the first and second internal electrodes 8 and 9, respectively.

The material composition of the external electrodes 6 and 7 is not limited, and the material of the external electrodes 6 and 7 may be the same as or different from the internal electrodes 8 and 9.

Specifically, the first and second external electrodes 6 and 7 can be made of a sintered layer of any of various conductive metal powders of Ag, Pd, Ag—Pd, Pd, Cu, Cu alloys and the like, or a sintered layer containing any one of various types of glass frit of $B_2O_3$—$Li_2O$—$SiO_2$—$BaO$ system, $B_2O_3$—$SiO_2$—$BaO$ system, $Li_2O$—$SiO_2$—$BaO$ system, $B_2O_3$—$SiO_2$—$ZnO$ system and the like. The material composition of the external electrodes 6 and 7 is appropriately selected according to the application and operating place of the monolithic ceramic capacitor 1, etc.

Although the external electrodes 6 and 7 can be formed by coating the conductive paste containing a metal powder material as a conductive component on the lamination 3 after burning, as described above, the external electrodes 6 and 7 can also be formed by coating the paste on the lamination before burning and then baking the coating at the same time as burning of the lamination 3.

(10) Then, as occasion demands, the external electrodes 6 and 7 are coated with the plated layers 10 and 11, respectively, made of Ni, Cu or Ni—Cu alloy, and the second plated layers 12 and 13 made of solder, tin or the like are further formed on the plates layers 10 and 11, respectively, in order to improve solderability. As a result, the monolithic ceramic capacitor having the structure shown in FIG. 3 is obtained.

EXAMPLES

The present invention is described in further detail below with reference to examples.

Preparation of Sample (1) First, barium titanate ($BaTiO_3$) powder as the ceramic raw material powder was prepared by the hydrolysis method, and then calcined at 870° C. to obtain a barium titanate powder having an average particle diameter of 160 nm.

(2) Next, Dy+Mg+Mn and Si were added in oxide powder form to the $BaTiO_3$ powder to prepare a ceramic composition.

(3) Next, a polyvinyl butyral binder (PVB), a phthalate plasticizer (DOP) and an organic solvent such as ethanol or toluene were added to the powder of the barium titanate ceramic composition, and the resultant mixture was wet-dispersed by the ball mill method so that the ceramic powder was not ground. The resultant ceramic slurry was coated on a carrier film (PET film) by the doctor blade method, and then dried to prepare a ceramic green sheet having a thickness of each of 4.5 $\mu$m and 1.5 $\mu$m.

(4) In order to smooth the surface of the thus-prepared ceramic green sheet, calender roll processing was performed at a roll temperature of 50° C. and a linear pressure between rolls of 400 kgf/cm. As the calender roll, a single nip roll-type calender roll was used, which comprised a pair of metal rolls (nip rolls) each having a mirror-polished hard chromium plated layer formed on the surface thereof and a heater with a temperature control function, for controlling the surface temperature of the pair of metal rolls to the predetermined temperature.

Also, plate pressing was performed at a pressing plate surface temperature of 70° C. and a pressing pressure of 5,000 kgf/cm$^2$.

As the plate press, a plate press was used, which comprised a pair of parallel plates each having a mirror-polished hard chromium plated layer formed the surface thereof, a heater with a temperature control function for controlling the parallel plates to the predetermined temperature, and a pressure control for controlling the pressing pressure of the parallel plates.

Hydrostatic pressing was performed under conditions of a pressing temperature of 80° C. and a pressing pressure of 3,000 kgf/cm$^2$.

As the hydrostatic press, a hydrostatic press was used, which comprised a pressure container filled with a liquid such as oil or water, a liquid temperature control for controlling the liquid such as oil or water to the predetermined temperature, a pressure cylinder for pressurizing the liquid such as oil or water, and a pressure control for controlling pressure.

(5) Electrode paste was coated on the ceramic green sheet subjected to the smoothing process (primary smoothing). The thickness of the electrode paste coating was 1 $\mu$m.

For the electrode paste, a Ni powder having an average particle diameter of 100 nm and formed by a liquid-phase reduction method was used. Then, 42% by weight of Ni powder, 44% by weight of an organic vehicle prepared by dissolving 6% by weight of ethyl cellulose binder in 94% by weight of terpineol, and 14% by weight of terpineol were mixed, and disintegrated to prepare a nickel electrode paste. The thus-prepared electrode paste was coated on the ceramic green sheet.

(6) Then, ceramic paste was coated on the region of the ceramic green sheet, in which the electrode paste was not coated. The thickness of the ceramic paste coating was 1 $\mu$m, which was the same as the electrode paste coating.

For the ceramic paste, the above-described barium titanate powder having an average particle diameter of 160 nm was used. Then, 30% by weight of this powder, 44% by weight of an organic vehicle prepared by dissolving 6% by weight of ethyl cellulose binder in 94% by weight of terpincol, and 26% by weight of terpineol were mixed, and disintegrated to prepare a ceramic paste. The thus-prepared ceramic paste was printed (coated) on the region of the ceramic green sheet in which the electrode paste was not coated, by a screen printing method so as to have the same thickness as the electrode paste coating.

(7) Then, the ceramic green sheet on which the electrode paste and the ceramic paste are coated was subjected to smoothing process (secondary smoothing) by using the calender roll. At this time, the processing temperature was 50° C., and the pressure was 300 kgf/cm².

(8) A predetermined number of the thus-prepared ceramic green sheets (sheets provided with electrodes) were laminated so that the ends of the electrode paste coatings (internal electrodes) were alternately exposed at the opposite sides, followed by compression. The lamination integrated by compression was cut in a predetermined size to obtain a green lamination (green chip).

(9) Then, the green lamination was heated to a temperature of 300° C. in a $N_2$ atmosphere to burn the binder, and then burned in a reducing atmosphere composed of $H_2$—$N_2$—$H_2O$ gas at an oxygen partial pressure of $10^{-9}$ to $10^{-12}$ MPa in a profile in which it was maintained at a maximum burning temperature of 1200° C. for 2 hours.

(10) A Ag paste containing $B_2O$—$Li_2O$—$SiO_2$—$BaO$ system glass frit was coated on both end surfaces of the lamination after burning, and then baked at a temperature of 600° C. in a $N_2$ atmosphere to form external electrodes electrically connected to the internal electrodes.

The thus-obtained monolithic ceramic capacitor had external dimensions in which the width was 0.8 mm, the length was 1.6 mm and the thickness of each of the ceramic layers interposed between the internal electrodes was 3 μm or 1 μm.

In order to confirm the effect of coating of the ceramic paste only, and the effect of the secondary smoothing, a ceramic green sheet was prepared only by primary smoothing without coating the ceramic paste and secondary smoothing, and a ceramic green sheet was prepared by primary smoothing and coating the ceramic paste without secondary smoothing. By using these ceramic green sheets, monolithic ceramic capacitors were manufactured under the same conditions as the above.

Furthermore, for comparison, a ceramic green sheet (conventional ceramic green sheet) was prepared without primary smoothing, coating the ceramic paste, and secondary smoothing, and used for manufacturing a monolithic ceramic capacitor of a comparative example out of the range of the present invention under the same conditions as the above.

Evaluation of Samples

The laminated structure, electric properties, and reliability of the monolithic ceramic capacitors obtained as described above were evaluated.

The structural defects of each of the monolithic ceramic capacitors were evaluated by the rate of short-circuit defects (%) to confirm the presence of the effect of the present invention. The short-circuit defects were measured by using an automatic bridge-type measurement apparatus (LCR meter/YHP 4274A). The rate of short-circuit defects was determined by identifying capacitors in which the target capacitance (C) could not be obtained from 100 samples.

The capacitance and dielectric loss (tan δ) were measured by using the automatic bridge-type measurement apparatus according to JIS standards 5102, and the relative dielectric constant ($\varepsilon$) was calculated from the measured capacitance.

In a high-temperature load test, a DC voltage of 10 V per mm of dielectric ceramic layer thickness was applied at a temperature of 150° C. to measure changes of insulating resistance with time. In the high-temperature load test, the time when the insulation resistance (R) of each sample was $10^5$ Ω or less was considered as a failure time, and the average lifetime (hr) was evaluated based on this time.

Tables 8 to 11 show the evaluated properties of each of the monolithic ceramic capacitors when the element thickness and the number of the ceramic green sheet laminated were changed.

Tables 8 to 11 also show the measured properties of the monolithic ceramic capacitor of the comparative example using the ceramic green sheets not subjected to the smoothing process.

Evaluation of Sample Group 1

Table 8 shows the results of measurement of the properties of the monolithic ceramic capacitors in which the element thickness was 3 μm and the number of the sheets laminated was 100.

TABLE 8

| Sample No. | Type of Primary Smoothing | Presence of Ceramic Paste Coating | Presence of Secondary Smoothing | Relative Dielectric Constant | tan δ (%) | Rate of Short-Circuit Defects (%) | Average Lifetime (hr) |
|---|---|---|---|---|---|---|---|
| Comparative Example 1 | Without Smoothing | No | No | 1450 | 2.4 | 70 | 35 |
| 1 | Calender Roll | No | No | 1470 | 2.5 | 10 | 80 |
| 2 | Plate Pressing | No | No | 1480 | 2.5 | 15 | 78 |
| 3 | Hydrostatic Pressing | No | No | 1460 | 2.5 | 13 | 82 |
| 4 | Calender Roll | No | No | 1490 | 2.4 | 0 | 90 |
| 5 | Plate Pressing | Yes | No | 1480 | 2.5 | 0 | 95 |
| 6 | Hydrostatic Pressing | Yes | No | 1480 | 2.5 | 0 | 96 |

TABLE 8-continued

| Sample No. | Type of Primary Smoothing | Presence of Ceramic Paste Coating | Presence of Secondary Smoothing | Relative Dielectric Constant | tan δ (%) | Rate of Short-Circuit Defects (%) | Average Lifetime (hr) |
|---|---|---|---|---|---|---|---|
| 7 | Calender Roll | Yes | Yes | 1470 | 2.4 | 0 | 92 |
| 8 | Plate Pressing | Yes | Yes | 1480 | 2.5 | 0 | 96 |
| 9 | Hydrostatic Pressing | Yes | Yes | 1460 | 2.5 | 0 | 97 |

Table 8 indicates that in Comparative Example 1 using the ceramic green sheets produced without primary smoothing, coating of the ceramic paste and secondary smoothing, the rate of short-circuit defects is 80% and the lifetime is 35 hr.

On the other hand, in the monolithic ceramic capacitors of Samples Nos. 1 to 3 (using the ceramic green sheets subjected to only primary smoothing without coating of the ceramic powder and secondary smoothing) of the present invention, the rate of short-circuit defects is decreased to 10 to 15% and the lifetime is improved to about 80 hr.

In the monolithic ceramic capacitors of Samples Nos. 4 to 6 (using the ceramic green sheets subjected to primary smoothing and coating of the ceramic powder without secondary smoothing) of the present invention, the occurrence of short-circuit defects is not observed and the lifetime is improved to 90 hr.

In the monolithic ceramic capacitors of Samples Nos. 7 to 9 (using the ceramic green sheets subjected to primary smoothing, coating of the ceramic powder and secondary smoothing) of the present invention, properties higher than Sample Nos. 4 to 6 or equivalent thereto are obtained.

As a result of observation of a polished section of a short-circuit defective product on a microscope, delamination and bending of an extension electrode portion were observed.

Evaluation of Sample Group 2

Table 9 shows the results of measurement of the properties of the monolithic ceramic capacitors in which the element thickness was 3 μm and the number of the sheets laminated was 300.

TABLE 9

| Sample No. | Type of Primary Smoothing | Presence of Ceramic Paste Coating | Presence of Secondary Smoothing | Relative Dielectric Constant | tan δ (%) | Rate of Short-Circuit Defects (%) | Average Lifetime (hr) |
|---|---|---|---|---|---|---|---|
| Comparative Example 2 | Without Smoothing | No | No | 1420 | 2.5 | 95 | 8 |
| 10 | Calender Roll | No | No | 1480 | 2.4 | 36 | 40 |
| 11 | Plate Pressing | No | No | 1470 | 2.4 | 35 | 48 |
| 12 | Hydrostatic Pressing | No | No | 1510 | 2.4 | 40 | 42 |
| 13 | Calender Roll | Yes | No | 1480 | 2.4 | 10 | 60 |
| 14 | Plate Pressing | Yes | No | 1450 | 2.5 | 5 | 55 |
| 15 | Hydrostatic Pressing | Yes | No | 1490 | 2.5 | 8 | 66 |
| 16 | Calender Roll | Yes | Yes | 1500 | 2.5 | 0 | 82 |
| 17 | Plate Pressing | Yes | Yes | 1500 | 2.5 | 0 | 84 |
| 18 | Hydrostatic Pressing | Yes | Yes | 1480 | 2.5 | 0 | 91 |

Table 9 indicates that in Comparative Example 2 using the ceramic green sheets produced without primary smoothing, coating of the ceramic paste and secondary smoothing, the rate of short-circuit defects is 95% and the lifetime is 8 hr.

On the other hand, in the monolithic ceramic capacitors of Samples Nos. 10 to 12 (using the ceramic green sheets subjected to only primary smoothing without coating of the ceramic powder and secondary smoothing) of the present invention, the rate of short-circuit defects is decreased to 30 to 40% and the lifetime is improved to about 40 to 50 hr.

In the monolithic ceramic capacitors of Samples Nos. 13 to 15 (using the ceramic green sheets subjected to primary smoothing and coating of the ceramic powder without secondary smoothing) of the present invention, the rate of short-circuit defects is decreased to 10% or less and the lifetime is improved to about 60 hr.

In the monolithic ceramic capacitors of Samples Nos. 16 to 18 (using the ceramic green sheets subjected to primary smoothing, coating of the ceramic powder and secondary smoothing) of the present invention, the occurrence of short-circuit defects is not observed and the lifetime is improved to 80 to 90 hr.

As a result of observation of a polished section of a short-circuit defective product on a microscope, delamination and bending of an extension electrode portion were observed.

Evaluation of Sample Group 3

Table 10 shows the results of measurement of the properties of the monolithic ceramic capacitors in which the element thickness was 1 μm and the number of the sheets laminated was 100.

smoothing and coating of the ceramic powder without secondary smoothing) of the present invention, the rate of short-circuit defects is decreased to 40% or less and the lifetime is improved to about 50 hr.

In the monolithic ceramic capacitors of Samples Nos. 25 to 27 (using the ceramic green sheets subjected to primary smoothing, coating of the ceramic powder and secondary smoothing) of the present invention, the rate of short-circuit

TABLE 10

| Sample No. | Type of Primary Smoothing | Presence of Ceramic Paste Coating | Presence of Secondary Smoothing | Relative Dielectric Constant | tan δ (%) | Rate of Short-Circuit Defects (%) | Average Lifetime (hr) |
|---|---|---|---|---|---|---|---|
| Comparative Example 3 | Without Smoothing | No | No | 1420 | 2.4 | 98 | 0.1 |
| 19 | Calender Roll | No | No | 1430 | 2.4 | 70 | 22 |
| 20 | Plate Pressing | No | No | 1470 | 2.4 | 65 | 18 |
| 21 | Hydrostatic Pressing | No | No | 1500 | 2.5 | 72 | 20 |
| 22 | Calender Roll | Yes | No | 1480 | 2.4 | 40 | 50 |
| 23 | Plate Pressing | Yes | No | 1480 | 2.5 | 35 | 45 |
| 24 | Hydrostatic Pressing | Yes | No | 1500 | 2.4 | 38 | 47 |
| 25 | Calender Roll | Yes | Yes | 1520 | 2.5 | 3 | 60 |
| 26 | Plate Pressing | Yes | Yes | 1560 | 2.5 | 2 | 62 |
| 27 | Hydrostatic Pressing | Yes | Yes | 1540 | 2.5 | 5 | 66 |

Table 10 indicates that in Comparative Example 3 using the ceramic green sheets produced without primary smoothing, coating of the ceramic paste and secondary smoothing, the rate of short-circuit defects is 98% and the lifetime is 1 hr.

On the other hand, in the monolithic ceramic capacitors of Samples Nos. 19 to 21 (using the ceramic green sheets subjected to only primary smoothing without coating of the ceramic powder and secondary smoothing) of the present invention, the rate of short-circuit defects is decreased to 65 to 72% and the lifetime is improved to about 20 hr.

In the monolithic ceramic capacitors of Samples Nos. 22 to 24 (using the ceramic green sheets subjected to primary defects is decreased to 5% or less and the lifetime is improved to about 60 hr.

As a result of observation of a polished section of a short-circuit defective product on a microscope, delamination and bending of an extension electrode portion were observed.

Evaluation of Sample Group 4

Table 11 shows the results of measurement of the properties of the monolithic ceramic capacitors in which the element thickness was 1 μm and the number of the sheets laminated was 450.

TABLE 11

| Sample No. | Type of Primary Smoothing | Presence of Ceramic Paste Coating | Presence of Secondary Smoothing | Relative Dielectric Constant | tan δ (%) | Rate of Short-Circuit Defects (%) | Average Lifetime (hr) |
|---|---|---|---|---|---|---|---|
| Comparative Example 4 | Without Smoothing | No | No | 1450 | 2.5 | 100 | — |
| 28 | Calender Roll | No | No | 1460 | 2.6 | 80 | 5 |
| 29 | Plate Pressing | No | No | 1480 | 2.4 | 85 | 2 |
| 30 | Hydrostatic Pressing | No | No | 1480 | 2.4 | 92 | 8 |
| 31 | Calender Roll | Yes | No | 1500 | 2.6 | 32 | 25 |
| 32 | Plate Pressing | Yes | No | 1530 | 2.5 | 35 | 35 |

TABLE 11-continued

| Sample No. | Type of Primary Smoothing | Presence of Ceramic Paste Coating | Presence of Secondary Smoothing | Relative Dielectric Constant | tan δ (%) | Rate of Short-Circuit Defects (%) | Average Lifetime (hr) |
|---|---|---|---|---|---|---|---|
| 33 | Hydrostatic Pressing | Yes | No | 1490 | 2.6 | 38 | 37 |
| 34 | Calender Roll | Yes | Yes | 1520 | 2.6 | 10 | 50 |
| 35 | Plate Pressing | Yes | Yes | 1540 | 2.5 | 8 | 46 |
| 36 | Hydrostatic Pressing | Yes | Yes | 1520 | 2.6 | 7 | 51 |

Table 11 indicates that in Comparative Example 4 using the ceramic green sheets produced without primary smoothing, coating of the ceramic paste and secondary smoothing, the rate of short-circuit defects is 100%.

On the other hand, in the monolithic ceramic capacitors of Samples Nos. 28 to 30 (using the ceramic green sheets subjected to only primary smoothing without coating of the ceramic powder and secondary smoothing) of the present invention, the rate of short-circuit defects is decreased to 80 to 92%.

In the monolithic ceramic capacitors of Samples Nos. 31 to 33 (using the ceramic green sheets subjected to primary smoothing and coating of the ceramic powder without secondary smoothing) of the present invention, the rate of short-circuit defects is decreased to 30 to 40% and the lifetime is improved to about 30 hr.

In the monolithic ceramic capacitors of Samples Nos. 34 to 36 (using the ceramic green sheets subjected to primary smoothing, coating of the ceramic powder and secondary smoothing) of the present invention, the rate of short-circuit defects is decreased to 10% or less and the lifetime is improved to about 50 hr.

As a result of observation of a polished section of a short-circuit defective product on a microscope, delamination and bending of an extension electrode portion were observed.

It is confirmed from the above results that the smoothing process (primary smoothing) can decrease the surface roughness (Ra) of a ceramic green sheet to improve properties.

It is also confirmed that coating of the ceramic paste and the second smoothing process after the primary smoothing process produce more satisfactory results.

Although, in this embodiment, a barium titanium system powder is used as the ceramic powder, the type of the ceramic powder is not limited to this, and ceramic powders respectively containing strontium titanate, calcium titanate and the like as main components can also be used in the present invention. In this case, the same effects as the above can be obtained.

Although the organic slurry is used as the slurry for ceramic green sheets, the use of aqueous slurry can produce the same effects.

Also, the types of the binder and the plasticizer are not limited to the polyvinyl butyral resin (PVB) and the phthalate plasticizer (DOP), and the types and amounts can appropriately be selected according to the intended ceramic green sheet.

Although, in this embodiment, Ni is used as an example of materials of the internal electrodes, other materials such as Pd, Ag—Pd, Cu, Pt and alloys containing these metals as main components can also be used.

Although in this embodiment, the manufacture of a monolithic ceramic capacitor is described as an example, the method of manufacturing a multilayer ceramic electronic part of the present invention can widely be applied to manufactures of various other multilayer ceramic electronic parts such as a multilayer ceramic varistor, a multilayer ceramic piezoelectric part, a multilayer substrate, etc.

The present invention is not limited to the above embodiments and examples with respect to other points, and various applications and modifications can be made in the scope of the gist of the invention.

In the method of manufacturing a multilayer ceramic electronic part of the present invention, a ceramic green sheet obtained by forming ceramic slurry in a sheet is smoothed, and then electrode paste for forming an internal electrode is coated in the predetermined pattern to form a sheet provided with an electrode. A plurality of the sheets provided with electrodes are laminated to form a lamination, followed by burning under predetermined conditions so that the multilayer ceramic electronic part can be efficiently manufactured while preventing deterioration in the life due to unevenness in the interfaces between internal electrodes and ceramic layers, and the occurrence of a structural defect (delamination, bending of an electrode portion, or the like) in a multilayer thin film. Therefore, a multilayer ceramic electronic part having target properties (for example, a design capacity value) and high reliability can efficiently be manufactured.

Namely, the process for smoothing the ceramic green sheet can improve the surface smoothness of the ceramic green sheet independently of the particle diameter and dispersibility of ceramic particles, thereby decreasing the surface roughness (Ra) in the interfaces between the ceramic layers and the internal electrodes of the manufactured multilayer ceramic electronic part.

Furthermore, since the density of the sheet is increased by smoothing, it is possible to reduce or prevent the occurrence of defects such as pores in the ceramic layers, and the sheet attack phenomenon in which the solvent component of the electrode paste permeates into the sheet to dissolve the sheet binder.

Even in forming internal electrodes (base metal internal electrodes) by using the electrode paste containing a base metal powder as a conductive component, the use of the ceramic green sheet subjected to the smoothing process enables the manufacture of a multilayer electronic part which less produces deterioration of its life due to unevenness in the interfaces between the internal electrodes and the ceramic layers, and structural defects (delamination, bending of an electrode portion, or the like) in a multilayer thin film, thereby decreasing the electrode material cost without deteriorating reliability.

In the method of manufacturing a multilayer ceramic electronic part of the present invention, the smoothing process is performed by using any one of the calender roll method, the plate pressing method and the hydrostatic pressing method, thereby securely smoothing the surface of the green sheet and improving the smoothness of the interfaces between internal electrodes and ceramic layers. As a result, the pressure resistance, durability (life) and reliability of properties of the multilayer ceramic electronic part can be improved.

In the method of manufacturing a multilayer ceramic electronic part of the present invention, after the electrode paste is coated on the ceramic green sheet subjected to the smoothing process and then dried, a ceramic paste is coated on the region (sheet portion) of the ceramic green sheet in which the electrode paste is not coated, and then dried to form the ceramic green sheet without a step at the boundary between the region coated with the electrode paste and the uncoated region.

Therefore, it is possible to decrease the structural defects of the multilayer ceramic electronic part, such as short-circuit defects, delamination, etc. It is also possible to prevent breakage of the internal electrodes due to the step, thereby improving reliability.

In the method of manufacturing a multilayer ceramic electronic part of the present invention, after the electrode paste and the ceramic paste are coated on the ceramic green sheet subjected to the smoothing process and dried, the ceramic green sheet can be further smoothed, thereby removing print deviation, coating waviness during printing, and a saddle phenomenon. Therefore, surfaces of the electrode paste coating and the ceramic paste coating can be further smoothed, and the densities thereof can be increased. As a result, the smoothness of the interfaces between the internal electrodes and the ceramic layers in the multilayer ceramic electronic part can be improved to improve pressure resistance. Also, the occurrence of structural defects (delamination, bending of an electrode portion, etc.), which are easily produced in multilayer films, can be suppressed and prevented to effectively manufacture the multilayer ceramic electronic part having high reliability.

The method further comprising coating the ceramic paste and performing the secondary smoothing process is particularly useful for manufacturing a multilayer ceramic electronic part in which the thickness (element thickness) of each of the ceramic layers is 3 µm or less. For example, in application to the manufacture of a large-capacity, small, monolithic ceramic capacitor comprising a multilayer film, a monolithic ceramic capacitor having excellent electric properties and high reliability can be efficiently manufactured.

In the method of manufacturing a multilayer ceramic electronic part of the present invention, the secondary smoothing process is performed by any one of the calender roll method, the plate pressing method and the hydrostatic pressing method to more securely smooth the surfaces of the electrode paste coating and the ceramic paste coating applied to the surface of the ceramic green sheet, improving the smoothness of the whole sheet provided with an electrode, and making the present invention more effective.

What is claimed is:

1. A method of manufacturing a multilayer ceramic electronic part comprising:

providing a plurality of ceramic green sheets prepared by the method of coating ceramic slurry comprising a ceramic powder dispersed in a dispersion medium on a carrier film to form a sheet, drying the sheet-formed ceramic slurry on the carrier film, and hydrostatically pressing the dry sheet obtained by drying the ceramic slurry on the carrier film under conditions of a pressing surface temperature of about 0 to 150° C. and a pressing pressure of about 500 to 10,000 kgf/cm² to smooth the surface of the sheet, coating an electrode paste on ceramic green sheets subjected to the smoothing process in a predetermined pattern;

coating a ceramic paste containing a ceramic powder, a binder and a solvent on a region of the electrode paste-coated surface on which the electrode paste was not coated, subjecting the ceramic green sheet having the electrode paste and the ceramic paste coated thereon to a secondary smoothing process by pressing under conditions of a pressing surface temperature of about 0 to 150° C. and a pressing pressure of about 500 to 10,000 kgf/cm² to smooth the surface of the sheet;

laminating the sheets provided with electrodes to form a lamination, and burning the lamination.

2. A method of producing a ceramic green sheet according to claim 1, wherein hydrostatic pressing is performed by under conditions of a pressing temperature of about 20 to 100° C. and a pressing pressure of about 1,000 to 6,000 kgf/cm².

3. A method of producing a ceramic green sheet according to claim 1, wherein the smoothing process is performed such that the surface roughness (Ra value) of the resulting ceramic green sheet is 100 nm or less.

4. A method of producing a ceramic green sheet according to claim 1, wherein the ceramic green sheet is separated from the carrier film, and a plurality of such separated sheets are laminated.

5. A method of manufacturing a multilayer electronic part according to claim 1, wherein the electrode paste for forming an internal electrode comprising a base metal powder as a conductive component so that the internal electrode formed after burning the lamination comprise a base metal.

6. A method of manufacturing a multilayer ceramic electronic part according to claim 1, wherein the secondary smoothing process is performed by a calendar roll pressing, plate pressing or hydrostatic pressing.

7. A method of producing a multilayer ceramic electronic part according to claim 6, wherein the secondary smoothing process is performed by under conditions of a pressing temperature of about 20 to 100° C. and a pressing pressure of about 1,000 to 6,000 kgf/cm².

8. A method of producing a multilayer ceramic electronic part according to claim 7, wherein the secondary smoothing is effected by a pair of pressing plates.

9. A method of producing a multilayer ceramic electronic part according to claim 7, wherein the secondary smoothing is effected by hydrostatic pressing.

10. A method of producing a multilayer ceramic electronic part according to claim 7, wherein the secondary smoothing comprises: calendering the dry sheet using a calender roll comprising at least a pair of nip rolls under conditions of a pressing pressure (linear pressure) of about 50 to 1,000 kgf/cm to smooth the surface of the sheet.

11. A method of producing a multilayer ceramic electronic part according to claim 10, wherein calender roll processing is performed under conditions of a nip roll surface temperature of about 20 to 100° C. and a pressing pressure (linear pressure) of about 100 to 600 kgf/cm.

* * * * *